US012561098B1

(12) United States Patent　　(10) Patent No.:　US 12,561,098 B1
Pletka et al.　　　　　　　　　　(45) Date of Patent:　Feb. 24, 2026

(54) WRITE STREAM SEPARATION FOR STORAGE CONTROLLERS

(71) Applicant: International Business Machines Corporation, Armonk, NY (US)

(72) Inventors: Roman Alexander Pletka, Uster (CH); Nikolaos Papandreou, Thalwil (CH); Radu Ioan Stoica, Zurich (CH); Charalampos Pozidis, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/949,776

(22) Filed: Nov. 15, 2024

(51) Int. Cl.
　　*G06F 12/00*　　　(2006.01)
　　*G06F 3/06*　　　(2006.01)
(52) U.S. Cl.
　　CPC .......... *G06F 3/0659* (2013.01); *G06F 3/0613* (2013.01); *G06F 3/0619* (2013.01); *G06F 3/0688* (2013.01)
(58) Field of Classification Search
　　None
　　See application file for complete search history.

(56) References Cited

U.S. PATENT DOCUMENTS

| | | | |
|---|---|---|---|
| 7,941,696 B2 | 5/2011 | Frost et al. | |
| 10,078,582 B2 | 9/2018 | Camp et al. | |
| 11,556,467 B1 * | 1/2023 | Wei | G06F 3/064 |
| 2019/0065058 A1 | 2/2019 | Camp et al. | |
| 2019/0272232 A1 | 9/2019 | Camp et al. | |
| 2024/0062823 A1 * | 2/2024 | Zhou | G06F 3/0679 |

FOREIGN PATENT DOCUMENTS

CN　　　110688323 A　　1/2020

OTHER PUBLICATIONS

Anonymous, "Method to Minimize SSD Garbage Collection Requirement and Write Amplification Reduction with Improved Inter-Page Administration," IP.com Prior Art Database, Technical Disclosure No. IPCOM000267475D, Oct. 29, 2021, 10 pages.

* cited by examiner

*Primary Examiner* — Daniel D Tsui
(74) *Attorney, Agent, or Firm* — Zilka-Kotab, P.C.

(57) ABSTRACT

A method according to one approach is for organizing blocks in a non-volatile storage controller. The method includes: forming a write stripe using a single block from channels of the non-volatile storage. First and second logical erase units are also formed by grouping the blocks from the formed write stripe into at least first and second sub-stripes. The first sub-stripe is assigned to store new data, and the second sub-stripe is assigned to store relocation data. Moreover, writing data to the respective sub-stripes is performed subpage stripe by sub-page stripe.

20 Claims, 12 Drawing Sheets

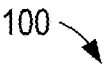

100

COMPUTER 101

PROCESSOR SET 110

| PROCESSING CIRCUITRY 120 | CACHE 121 |
|---|---|

COMMUNICATION FABRIC 111

VOLATILE MEMORY 112

PERSISTENT STORAGE 113

OPERATING SYSTEM 122

IMPROVED WRITE STREAM SEPARATION CODE

150

PERIPHERAL DEVICE SET 114

| UI DEVICE SET 123 | STORAGE 124 | IoT SENSOR SET 125 |
|---|---|---|

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

Form a write stripe

302

Form first and second logical erase units from the write stripe

304

Assign the first sub-stripe to store new data

306

Assign the second sub-stripe to store relocation data

308

From operation 314
⋮

310

Determine corresponding sub-stripe to satisfy the write request.

To operation 312
⋮

FIG. 4F

WRITE STREAM SEPARATION FOR STORAGE CONTROLLERS

BACKGROUND

The present invention relates to data storage systems, and more specifically, this invention relates to write stream separation.

Data production has continued to increase as computing power and the use of IoT devices advance. For instance, the rise of smart enterprise endpoints has led to large amounts of data being generated at remote locations. Data production will only further increase with the growth of 5G networks and an increased number of connected mobile devices. This issue has also become more prevalent as the complexity of machine learning models increases. Increasingly complex machine learning models have more intense training phases using larger amounts of training data.

Storing data in an efficient and effective manner has therefore evolved over time. For instance, the process of writing the increasing amount of data to memory has become more resource intensive. One contributing factor is that the amount of write cache that can be maintained in a controller is controlled. This stems from the fact that this memory is used to store transient data before it is written out to non-volatile storage and kept in the cache until the write operation to non-volatile storage completes.

SUMMARY

A method, according to one approach, is for organizing blocks in a non-volatile storage controller. The method includes: forming a write stripe using a single block from channels of the non-volatile storage. First and second logical erase units are also formed by grouping the blocks from the formed write stripe into at least first and second sub-stripes. The first sub-stripe is assigned to store new data, and the second sub-stripe is assigned to store relocation data. Moreover, writing data to the respective sub-stripes is performed sub-page stripe by sub-page stripe.

A computer program product, according to another approach, is for organizing blocks in a non-volatile storage controller. The computer program product includes: one or more computer-readable storage media. The computer program product also includes program instructions that are stored on the one or more storage media to perform any combination(s) of the foregoing methodologies.

A computer system, according to yet another approach, is for organizing blocks in a non-volatile storage controller. The computer system includes: a processor set, and one or more computer-readable storage media. The computer system also includes program instructions that are stored on the one or more storage media to cause the processor set to perform any combination(s) of the foregoing methodologies.

Other aspects and implementations of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one approach.

FIG. 4F is a representational view of stripes of non-volatile memory with sub-stripes allocated thereacross, in accordance with an in-use example.

DETAILED DESCRIPTION

Figure 2A:
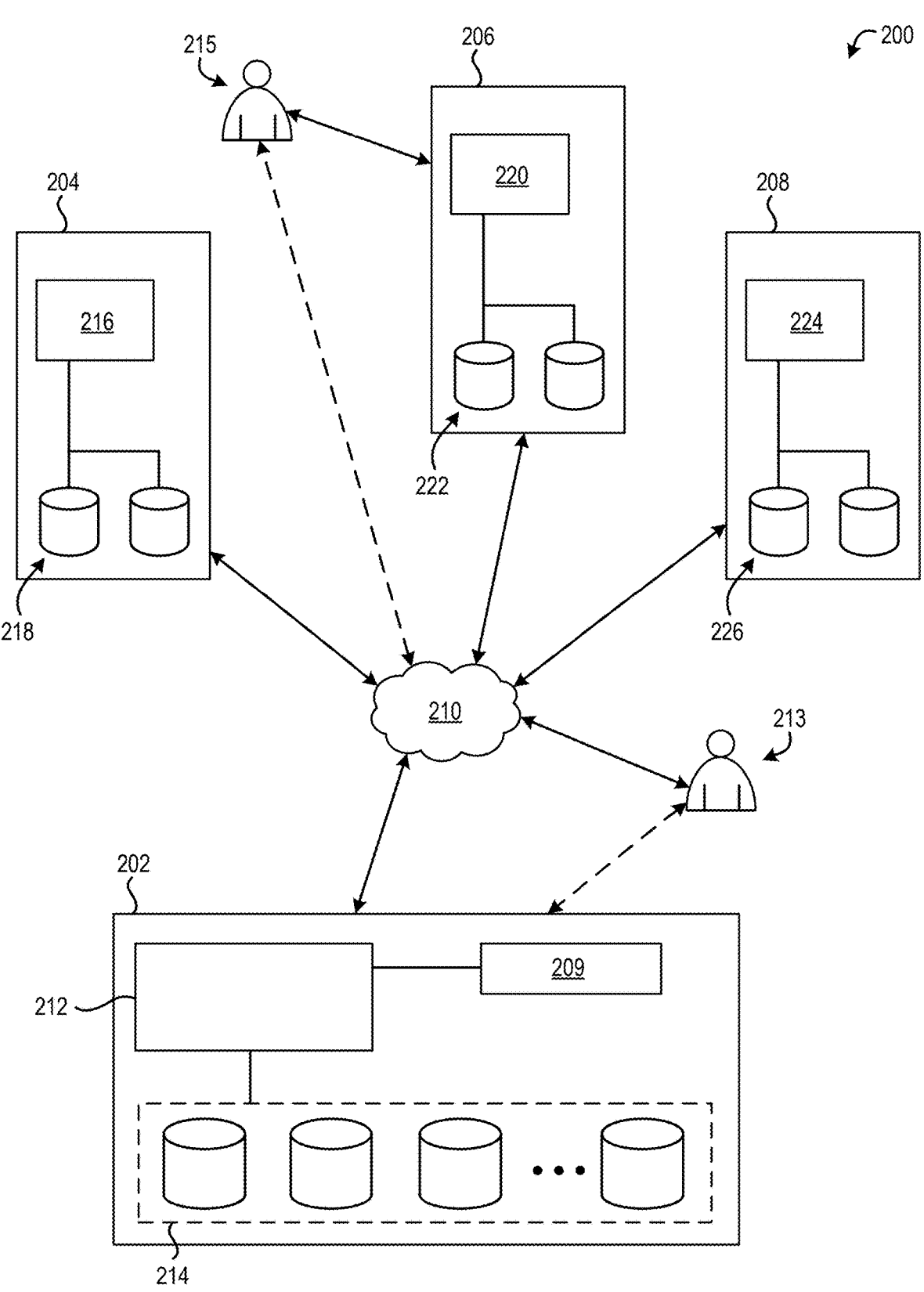
FIG. 2A is a representational view of a distributed system, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for organizing blocks in a non-volatile storage controller using multiple planes (e.g., channels), is illustrated in accordance with one approach. Approaches herein are thereby able to overcome the foregoing conventional shortcomings. For example, by separating different kinds of writes (e.g., host writes from relocation writes), approaches herein are able to significantly reduce the write amplification experienced during runtime. Moreover, by separating different write streams (e.g., write sources) based at least in part on their respective write heat, approaches herein are further able to reduce write amplification. For instance, the number of relocation writes performed is reduced by co-locating data of the same or similar type and/or heat in page stripes of the memory. Furthermore, by successfully adding parity information to the data stored in memory, approaches herein are desirably able to improve data retention while reducing write overhead, e.g., as will be described in further detail below.

In one general approach, a method for organizing blocks in a non-volatile storage controller includes: forming a write stripe using a single block from channels of the non-volatile storage. First and second logical erase units are also formed by grouping the blocks from the formed write stripe into at least first and second sub-stripes. The first sub-stripe is assigned to store new data, and the second sub-stripe is assigned to store relocation data. Moreover, writing data to the respective sub-stripes is performed sub-page stripe by sub-page stripe.

Approaches herein are thereby desirably able to overcome conventional shortcomings by organizing blocks in a non-volatile storage controller using multiple planes, such that a write stripe is formed using a blocks from different planes. Moreover, by grouping the blocks from the write stripe into at least two different sub-stripes, approaches herein are able to use different sub-stripes to store different types of data. The sub-stripes may also be allocated to be a desired size, e.g., based on the rate at which different types of data are being received and/or write amplification. This allows approaches herein to desirably garbage collect each of the sub-stripes individually without impacting data in the remaining sub-stripe(s) of the same block(s).

In some implementations, the method includes causing garbage collection to be performed only on the blocks in the first sub-stripe or the second sub-stripe, respectively. This allows for different portions of the same stripe or plane in memory to be garbage collected without impacting a remainder of the stripe or plane. This is a significant improvement over conventional products which are forced to garbage collect on a much larger scale, resulting in significantly higher compute overhead.

In some implementations, the sub-page stripes in the first sub-stripe are a same size, while the sub-page stripes in the second sub-stripe are a same size. Moreover, the size of the sub-page stripes in the first sub-stripe may be the same or different than the size of the sub-page stripes in the second sub-stripe. However, the sizes of the sub-page stripes in the respective first and second sub-stripes may be set based at least in part on a measured write amplification. Adjusting the size of the sub-stripes, e.g., based at least in part on the rate that data is received, allows for full sub-page stripes in corresponding page stripes to be filled at about the same time. In other words, pages of both sub-page stripes with the same page index in the blocks are preferably written concurrently as soon as the data is ready to be programmed.

In some implementations, the method further includes: causing new data to be written to a first sub-page stripe in the first sub-stripe in parallel with causing relocation data to be written to a first sub-page stripe in the second sub-stripe. Moreover, the new data is written to a first sub-page stripe in the first sub-stripe that has a same page index as the first sub-page stripe in the second sub-stripe that the relocation data is written to.

As noted above, adjusting the size of the sub-stripes (e.g., based at least in part on the rate that data is received), allows for full sub-page stripes in corresponding page stripes to be filled at about the same time. Accordingly, pages of both sub-page stripes with the same page index in the blocks are preferably written concurrently such that memory is filled in a consistent and efficient manner, reducing write amplification and improving data density.

In some implementations, each of the sub-page stripes include RAID parity. Moreover, each pair of the sub-page stripes in a same one of the first and second sub-stripes may include RAID parity. Implementing RAID parity allows for the approaches herein to be able to protect against write unit failures. Moreover, by including RAID parity in each of the sub-page stripes, approaches herein are desirably able to increase the density of RAID parity in memory, thereby increasing the recovery capabilities of each respective sub-stripe.

In some implementations, the write stripe extends across first and second planes of the non-volatile storage. The first sub-stripe includes sub-page stripes in the first plane and sub-page stripes in the second plane. Moreover, the second sub-stripe includes sub-page stripes in the first plane and sub-page stripes in the second plane. Data may further be written to the sub-page stripes of the respective first and second sub-stripes in a round robin order.

Writing data in a round robin order as such allows for the memory to distribute the wear associated with performing the writes evenly across the pages in memory as the allocation of sub-stripes to each stream will allocate blocks from all channels and planes evenly over time. Consequently, at one point in time concurrent writes will go to one single plane on each channel. For example, data may be written to one half of the extended stripe before switching to the other half, thereby avoiding having potentially two concurrent writes going to the same plane when separate write stripes would be used.

In another general approach, a computer program product is for organizing blocks in a non-volatile storage controller. The computer program product includes: one or more computer-readable storage media. The computer program product also includes program instructions that are stored on the one or more storage media to perform any combination(s) of the foregoing methodologies.

In yet another general approach, a computer system is for organizing blocks in a non-volatile storage controller. The computer system includes: a processor set, and one or more computer-readable storage media. The computer system also includes program instructions that are stored on the one or more storage media to cause the processor set to perform any combination(s) of the foregoing methodologies.

In still another general approach, a first write stream of relocation writes may be received along with a second write stream of new data writes. In response to receiving the two write streams, a write stripe having first and second logical erase units may be formed from memory using a single block from channels of the non-volatile storage. Moreover, the first and second logical erase may be formed by grouping the blocks from the formed write stripe into at least first and second sub-stripes. The size (e.g., lengths or relative storage capacity) of the respective first and second sub-stripes may be set based at least in part on the write heats of the respective write streams. Moreover, the write streams are written to the respective first and second sub-streams sub-page stripe by sub-page stripe. In other words, the write streams are written to the sub-page stripes of the respective sub-streams in an incremental (e.g., progressive) manner.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), SSDs, memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved write stream separation code at block 150 for organizing blocks in a non-volatile storage controller using multiple channels, is illustrated in accordance with one approach. Approaches herein are thereby able to overcome the foregoing conventional shortcomings. For example, by separating different kinds of writes (e.g., host writes from relocation writes), approaches herein are able to significantly reduce the write amplification experienced during runtime. Moreover, by separating different write streams (e.g., write sources) based at least in part on their respective write heat, approaches herein are further able to reduce write amplification. For instance, the number of relocation writes performed is reduced by co-locating data of the same or similar type and/or heat in page stripes of the memory. Furthermore, by successfully adding parity information to the data stored in memory, approaches herein are desirably able to improve data retention while reducing write overhead, e.g., as will be described in further detail below.

In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various approaches.

As noted above, data production has continued to increase as computing power and the use of IoT devices advance. For instance, the rise of smart enterprise endpoints has led to large amounts of data being generated at remote locations. Data production will only further increase with the growth of 5G networks and an increased number of connected mobile devices. This issue has also become more prevalent as the complexity of machine learning models increases. Increasingly complex machine learning models have more intense training phases using larger amounts of training data.

Storing data in an efficient and effective manner has therefore been difficult to achieve. For instance, the process of writing the increasing amount of data to memory has become more resource intensive over time. One contributing factor to this decline is that the amount of write cache that can be maintained in a controller is limited. This limitation stems from the fact that this memory is used to store transient data before it is written out to non-volatile storage and kept in the cache until the write operation to non-volatile storage completes. Manufacturing limitations also result in issues being experienced. For example, depending on the programming speed used, data may be filled into the pages of a word line in a jumbled manner which produces latency during the conventional write process. Non-volatile write caches have been implemented in an attempt to at least somewhat improve these issues, but the significant cost associated with non-volatile memory have limited the impact. Furthermore, limitations may exist on the number of non-volatile blocks that can be opened for programming new data.

In sharp contrast, various approaches herein include novel non-volatile memory controller capabilities which overcome the foregoing conventional shortcomings. For example, by separating different kinds of writes (e.g., host writes from relocation writes), approaches herein are able to significantly reduce the write amplification experienced during runtime. Moreover, by separating different write streams (e.g., write sources) based at least in part on their respective write heat, approaches herein are further able to reduce write amplification. For instance, the number of relocation writes performed is reduced by co-locating data of the same or similar type and/or heat in block stripes of the memory. Furthermore, by successfully adding parity information to the data stored in memory, approaches herein are desirably able to improve data retention while reducing write overhead, e.g., as will be described in further detail below.

Looking now to FIG. 2A, a system 200 having a distributed architecture is illustrated in accordance with one approach. For instance, the system 200 may include a clustered filesystem implemented therein. As an option, the present system 200 may be implemented in conjunction with features from any other approach listed herein, such as those described with reference to the other FIGS., such as FIG. 1. However, such system 200 and others presented herein may be used in various applications and/or in permutations which may or may not be specifically described in the illustrative approaches or implementations listed herein. Further, the system 200 presented herein may be used in any desired environment. Thus FIG. 2A (and the other FIGS.) may be deemed to include any possible permutation.

As shown, the system 200 includes a central data storage location 202 that is connected to a first edge node 204, a second edge node 206, and a third edge node 208. Specifically, the central data storage location 202 and edge nodes 204, 206, 208 are connected to a network 210, and may thereby be positioned in different geographical locations. However, it should also be noted that two or more of the edge nodes 204, 206, 208 and/or central data storage location 202 may be connected differently depending on the approach. According to an example, two edge compute nodes may be located relatively close to each other and connected by a wired connection, e.g., a cable, a fiber-optic link, a wire, etc.; etc., or any other type of connection which would be apparent to one skilled in the art after reading the present description.

The network 210 may be of any type, e.g., depending on the desired approach. For instance, in some approaches the network 210 is a WAN, e.g., such as the Internet. However, an illustrative list of other network types which network 210 may implement includes, but is not limited to, a LAN, a PSTN, a SAN, an internal telephone network, etc. As a result, any desired information, data, commands, instructions, responses, requests, etc. may be sent between the edge nodes 204, 206, 208 and/or central data storage location 202, regardless of the amount of separation which exists therebetween, e.g., despite being positioned at different geographical locations.

In some approaches, data may be sent between the edge nodes 204, 206, 208 and/or central data storage location 202 in response to requests received from running applications. In other approaches, data may be received at edge nodes 204, 206, 208 and/or central data storage location 202 from one or more other locations (not shown) that are also connected to network 210. Accordingly, each of the edge nodes 204, 206, 208 and central data storage location 202 include memory that is used to store data therein. For instance, edge nodes 204, 206, 208 include memory 218, 222, 226 and central data storage location 202 includes data storage array 214. In some approaches, the memory 218, 222, 226 at each of the respective edge nodes 204, 206, 208 include different drives. Similarly, the data storage array 214 at central data storage location 202 may include a number of data storage drives therein. Accordingly, data may be striped across the drives at each respective location in the system 200 in some approaches. In other approaches, data may be striped across the drives at two or more of the locations in system 200. In still other approaches, data may be striped across the drives of each of the locations in system 200. For example, RAID parity pages may be striped across the various data storage drives in memory 218, 222, 226 and/or data storage array 214, e.g., as would be appreciated by one skilled in the art after reading the present description.

The edge nodes 204, 206, 208 are also shown as having a different configuration than the central data storage location 202. For example, in some implementations the central data storage location 202 includes a large (e.g., robust) processor 212 coupled to a cache 209 and a data storage array 214 having a relatively high storage capacity. The central data storage location 202 is thereby able to process and store a relatively large amount of data, allowing it to be connected to, and manage, multiple different remote edge nodes (also referred to herein as "nodes"). As noted above, the central data storage location 202 may receive data, commands, etc. from any number of locations. The components included in the central data storage location 202 thereby preferably have a higher storage capacity and throughput than components included in each of the edge nodes 204, 206, 208 to accommodate the higher flow of data experienced at the central data storage location 202.

The first edge node 204 includes a processor 216 coupled to memory 218. Similarly, edge node 206 includes a processor 220 coupled to memory 222, and edge node 208 includes a processor 224 coupled to memory 226. The memory implemented at each of the edge nodes 204, 206, 208 may be used to store data received from one or more sensors (not shown) in communication with the respective edge nodes, a user 215 and/or administrator 213 in communication with one or more of the edge nodes and/or central data storage location respectively, other ones of the edge nodes, different systems also connected to network 210, etc.

As alluded to above, the memory 218, 222, 226 at each of the respective edge nodes 204, 206, 208 may implement a respective portion of a shared or clustered filesystem. For example, each memory 218, 222, 226 may effectively serve as a point (e.g., node) in a RAID configuration or otherwise clustered filesystem. Each of these nodes may thereby store different portions of data and/or parity for other nodes such that the clustered filesystem is distributed across the system 200 in such a way that improves data retention, e.g., as would be appreciated by one skilled in the art after reading the present description. However, in other approaches one or more of the edge nodes 204, 206, 208 and/or central data storage location 202 may include a number of storage drives therein that create a RAID configuration at the respective location. For example, data storage location 202 may include a number of data storage (e.g., memory) drives in the data storage array 214 that together may be used to form a RAID array of a desired type. Further, the central data storage location 202 may provide volumes created on top of the RAID array that can be provisioned to edge nodes 204, 206, 208 in a shared or non-shared fashion.

It should also be noted that while the edge nodes 204, 206, 208 are depicted as including similar components and/or design, each of the edge nodes 204, 206, 208 may include any desired components which may be implemented in any desired configuration. In some instances, each edge node in a system may be configured differently to provide each location with a different functionality. According to an example, which is in no way intended to limit the invention, edge node 204 may include a cryptographic module (not shown) that allows the edge node 204 to produce encrypted data, while edge node 206 includes a data compression module (not shown) that allows the edge node 206 to produce compressed data.

It follows that the different edge nodes (e.g., servers) in system 200 may have different performance capabilities. As noted above, the central data storage location 202 may have a higher storage capacity compared to the edge nodes 204, 206. While this may allow the central data storage location 202 the ability to store more data than the edge nodes 204, 206, 208, other factors impact performance. For example, traffic over network 210 may limit the amount of data that may be sent from the edge nodes 204, 206, 208 to the central data storage location 202. The workload experienced at a given time also impacts latency and limits the achievable performance of the system 200.

In some approaches, the processor 212 may use the cache 209 and/or storage array 214 to actually cause one or more data operations to be performed. According to an example, the processor 212 at the central data storage location 202 may be used to perform data aware writes to drives in an array while also reducing write overhead, e.g., regardless of the type and/or amount of data writes are received.

It should be noted that with respect to the present description, "data" may include any desired type of information. For instance, in different implementations data can include raw sensor data, metadata, program commands, instructions, etc. The type of data storage components that are included in memory throughout system 200 may also vary depending on the approach. To provide a context, and solely to assist the reader, various approaches may be described with reference to a type of non-volatile memory. For example, various approaches herein are described in the context of memory having solid state drives (SSDs), but this has been done by way of example only, and should not be deemed limiting. For instance, memory 218, 222, 226, and/or 214 may include hard disk drives (HHDs), magnetic tape drives, etc. in other approaches. Moreover, SSDs may further include any desired type of non-volatile random access memory (NVRAM), e.g., such as NAND Flash memory, NOR Flash memory, phase-change memory (PCM), magnetoresistive RAM (MRAM), resistive RAM (RRAM), etc.

As mentioned above, NVRAM-based SSDs operate fundamentally differently from those of traditional hard disk drives (HDDs). Data in conventional SSDs is typically organized in pages of 4, 8, or 16 KB sizes. Moreover, page read operations in SSDs are typically one order of magnitude faster than write operations and latency neither depends on the current nor the previous location of operations. This is due at least in part to the intrinsic properties of NVRAM memory such as NAND Flash. Flash-based SSDs write data out-of-place whereby a mapping table maps logical addresses of the written data to physical ones. This mapping table is typically referred to as the Logical-to-Physical Table (LPT).

As Flash-based memory cells exhibit read errors and/or failures due to wear or other reasons, additional redundancy may be used within memory pages as well as across memory chips (e.g., RAID-5 and RAID-6 like schemes). The additional redundancy within memory pages may include error correction code (ECC) which, for example, may include BCH, LDPC, or other codes. While the addition of ECC in pages is relatively straightforward, the organization of memory blocks into RAID-like stripes is more complex. For instance, individual blocks are retired over time which requires either reorganization of the stripes, or capacity reduction of the stripe. As the organization of stripes together with the LPT defines the placement of data, SSDs typically utilize a Log-Structured Array (LSA) architecture, e.g., as will be described in further detail below.

Figure 2B:
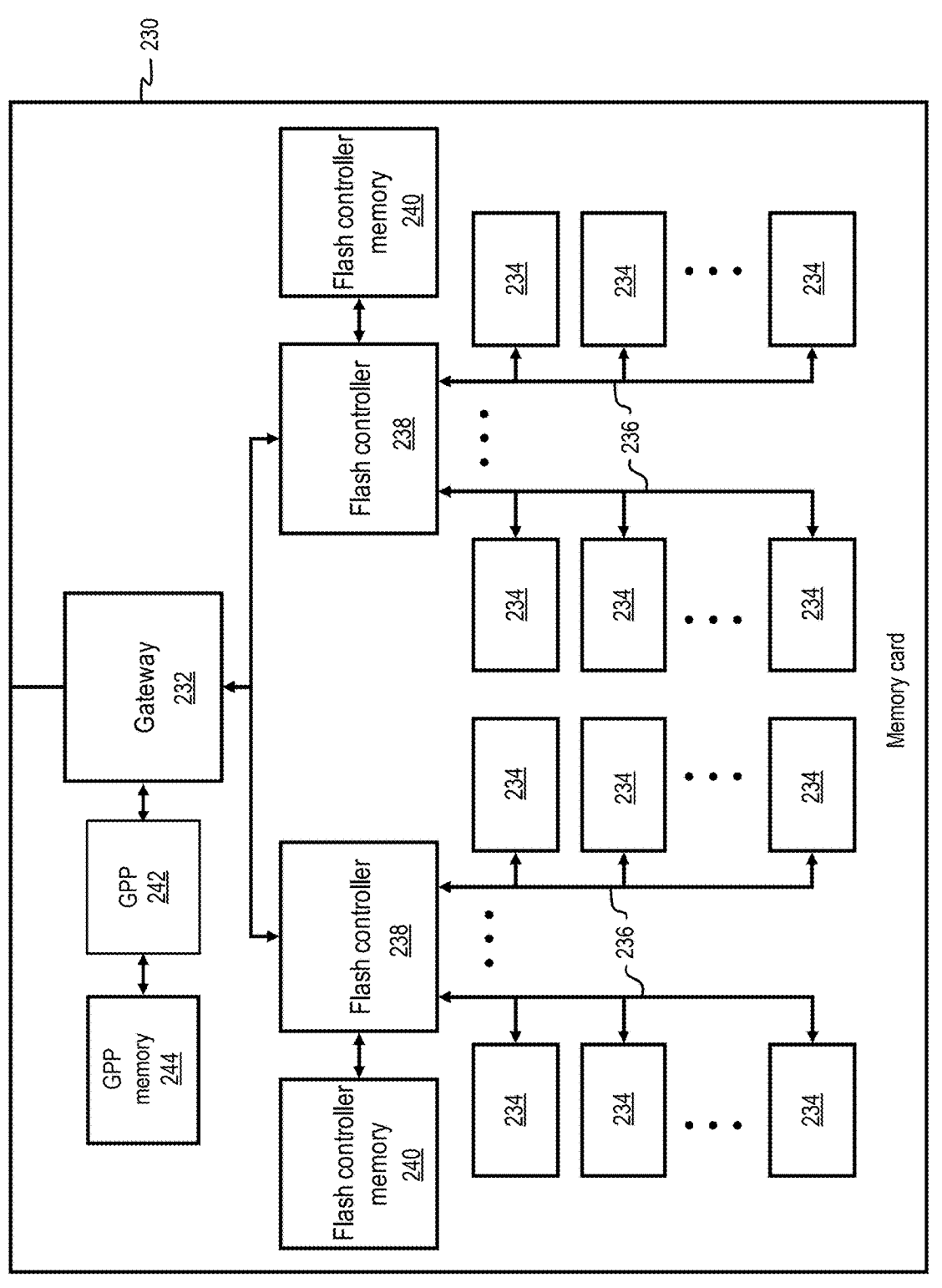
FIG. 2B is a diagram of a non-volatile memory card, in accordance with one approach.

Referring momentarily now to FIG. 2B, a memory card 230 is illustrated in accordance with one approach. One or more of the memory cards 230 may be used to form at least a portion of the data storage drives in system 200 of FIG. 2A. It should be noted that although memory card 230 is depicted as an exemplary non-volatile data storage card in the present approach, various other types of non-volatile data storage cards may be used in a data storage system according to alternate approaches. It follows that the architecture and/or components of memory card 230 are in no way intended to limit the invention, but rather have been presented as a non-limiting example.

Moreover, as an option, the present memory card 230 may be implemented in conjunction with features from any other approach listed herein, such as those described with reference to the other FIGS, e.g., such as FIG. 2A. However, such memory card 230 and others presented herein may be used in various applications and/or in permutations which may or may not be specifically described in the illustrative approaches listed herein. Further, the memory card 230 presented herein may be used in any desired environment.

As shown in FIG. 2B, memory card 230 includes a gateway 232, a general purpose processor (GPP) 242 (such as an ASIC, FPGA, CPU, etc.) connected to a GPP memory 244 (which may comprise RAM, ROM, battery-backed DRAM, phase-change memory PC-RAM, MRAM, STT-MRAM, etc., or a combination thereof), and a number of memory controllers 238, which include Flash controllers in the present example. Each memory controller 238 is connected to a plurality of NVRAM memory modules 234 (which may comprise NAND Flash or other non-volatile memory type(s) such as those listed above) via channels 236.

According to various approaches, one or more of the controllers 238 may be or include one or more processors, and/or any logic for controlling any subsystem of the memory card 230. For example, the controllers 238 typically control the functions of NVRAM memory modules 234 such as, data writing, data recirculation, data reading, etc. The controllers 238 may operate using logic known in the art, as well as any logic disclosed herein, and thus may be considered as a processor for any of the descriptions of non-volatile memory included herein, in various approaches.

Moreover, the controller 238 may be configured and/or programmable to perform or control some or all of the methodology presented herein. Thus, the controller 238 may be considered to be configured to perform various operations by way of logic programmed into one or more chips, modules, and/or blocks; software, firmware, and/or other instructions being available to one or more processors; etc., and combinations thereof.

Referring still to FIG. 2B, each memory controller 238 is also connected to a controller memory 240 which preferably includes a cache which replicates a non-volatile memory structure according to the various approaches described herein. However, depending on the desired approach, the controller memory 240 may be battery-backed DRAM, phase-change memory PC-RAM, MRAM, STT-MRAM, etc., or a combination thereof.

Figure 2C:
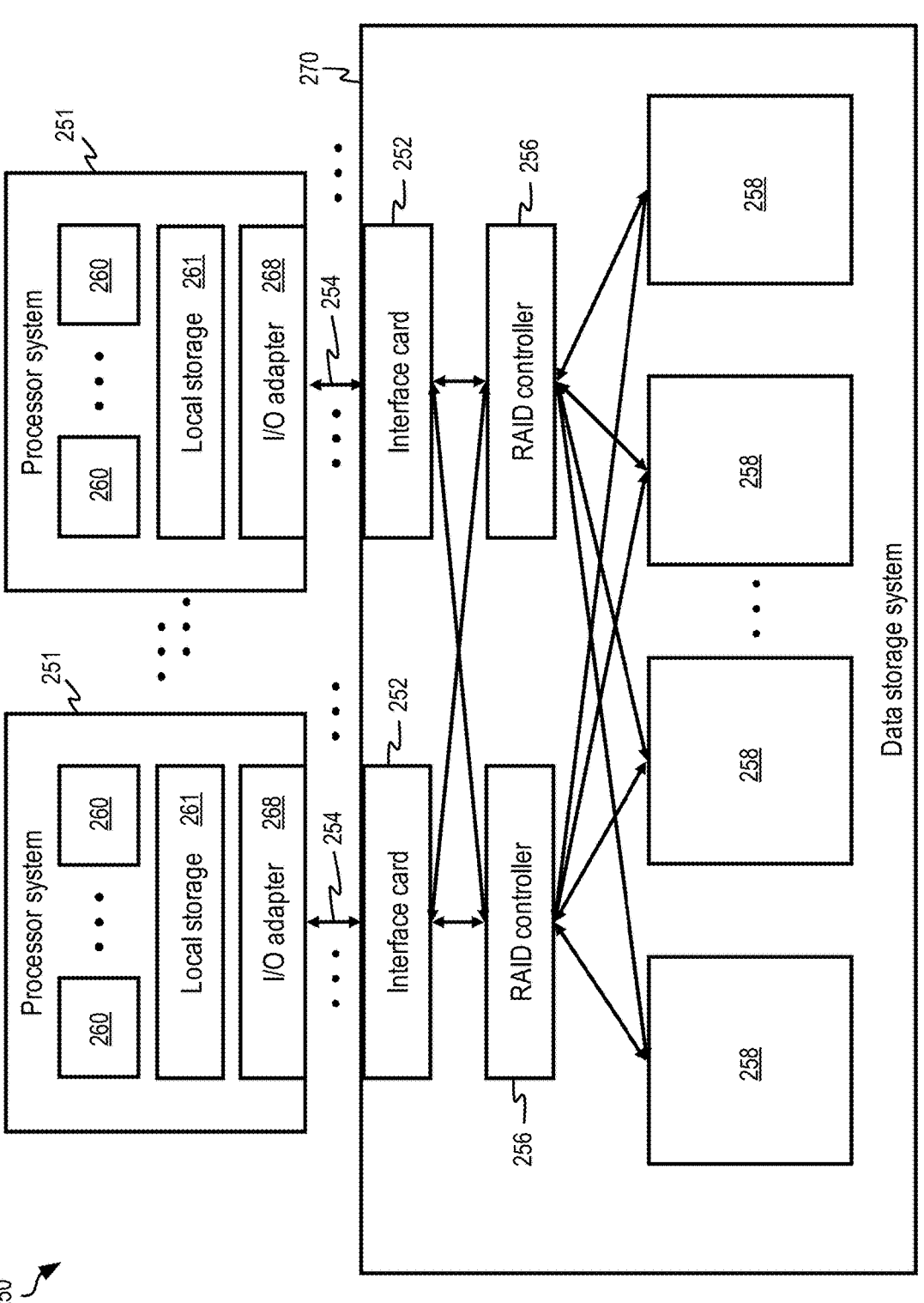
FIG. 2C is a diagram of a data storage system architecture, in accordance with one approach.

As previously mentioned, memory card 230 may be implemented in various types of data storage systems, depending on the desired approach. FIG. 2C illustrates a data storage system architecture 250 according to an exemplary approach which is in no way intended to limit the invention. Moreover, it should be noted that the data storage system architecture 250 of FIG. 2C may include various components found in the approach of FIG. 2B.

Looking to FIG. 2C, the data storage system 270 comprises a number of interface cards 252 configured to communicate via I/O interconnections 254 to one or more processor systems 251. The data storage system 270 may also comprise one or more RAID controllers 256 configured to control data storage in a plurality of non-volatile data storage cards 258. The non-volatile data storage cards 258 may comprise NVRAM, Flash memory cards, RAM, ROM, and/or some other known type of non-volatile memory.

The I/O interconnections 254 may include any known communication protocols, such as Fiber Channel (FC), FC over Ethernet (FCoE), Infiniband, Internet Small Computer System Interface (iSCSI), Transport Control Protocol/Internet Protocol (TCP/IP), Peripheral Component Interconnect Express (PCIe), Nonvolatile Memory Express (NVMe) etc., and/or any combination thereof. Moreover, the RAID controller(s) 256 in the data storage system 270 may perform a parity scheme similar to that employed by RAID-5, RAID-6, RAID-10, or some other suitable parity scheme (e.g., such as Reed-Solomon based encoding), as would be understood by one of skill in the art upon reading the present descriptions. Each processor system 251 further includes one or more processors 260 (such as CPUs, microprocessors, etc.), local data storage 261, and an I/O adapter 268 configured to communicate with the data storage system 270.

Referring again to FIG. 2B, memory controllers 238, GPP 242, and/or other controllers described herein (e.g., RAID controllers 256 of FIG. 2C) may be able to perform various functions on stored data, depending on the desired approach. Specifically, memory controllers or GPP 242 may include logic configured to perform any one or more of the following functions, which are in no way intended to be an exclusive list. In other words, depending on the desired approach, logic of a storage system may be configured to perform additional or alternative functions, as would be appreciated by one skilled in the art upon reading the present description.

Garbage Collection

Garbage collection in the context of NVRAM based memory controllers of the present description may include the process of identifying blocks of data to be reclaimed for future usage and relocating all pages that are still valid therein. Moreover, depending on the specific controller and/or the respective garbage collection unit of operation, logical erase blocks (LEBs—also referred to herein as "logical erase units") may be identified for being reclaimed and/or relocated. In conventional SDDs, one LEB corresponds typically to one block stripe, but alternative implementations may consider a fixed number of block stripes or a single block building a LEB as well.

A physical "block" represents a minimal unit that may be erased on non-volatile memory, e.g., such as NAND Flash memory, and thereby prepared for writing data thereto. However, a typical garbage collection unit of operation is often a multiple of the physical blocks of non-volatile memory, and is also referred to herein as a LEB. This is due to the fact that typically RAID-like parity is added in LEBs. Therefore, in case of a page or block failure data can only be rebuilt when all blocks in the LEB are still holding data. Accordingly, the individual blocks from the garbage collection unit can only be erased either individually or in a single unit once all still valid data from all blocks in the LEB has been relocated successfully to new locations. Hence, the full garbage collection units are garbage-collected as a single unit. Moreover, the size of the LEB directly affects the garbage collection induced write amplification. The larger the LEB, the more likely it becomes that unrelated data are stored together in the LEB, and therefore more of the LEB data may have to be relocated upon garbage collection selection.

Frequently, blocks from different dies and/or flash channels are grouped together, such that blocks from the same group can be read or written in parallel, thereby increasing overall bandwidth. It is also possible to combine the previous two methods, and to compose RAID stripes using blocks from different flash channels that can be accessed in parallel.

It should also be noted that an LEB may include any multiple of the physical memory block, which is a unit of physical erasure. Moreover, the organization of memory blocks into LEBs not only allows for adding RAID-like parity protection schemes among memory blocks from different memory chips, memory planes and/or channels but also allows for significantly enhancing performance through higher parallelism. For instance, multiple non-volatile memory blocks may be grouped together in a RAID stripe. As will be appreciated by one skilled in the art upon reading the present description, RAID schemes generally improve reliability and reduce the probability of data loss.

According to an exemplary approach, which is in no way intended to limit the invention, memory controllers (e.g., see controller 238 and/or GPP 242 of FIG. 2B) may internally perform a garbage collection. As previously mentioned, the garbage collection may include selecting a LEB to be relocated, after which all data that is still valid on the selected LEB may be relocated (e.g., moved). After the still valid data has been relocated, the LEB may be erased and thereafter, used for storing new data. The amount of data relocated from the garbage collected LEB determines the write amplification. Moreover, an efficient way to reduce the write amplification includes implementing heat separation.

Heat Separation

In the present context, the "write heat" of data refers to the rate (e.g., frequency) at which the data is updated (e.g., rewritten with new data). Memory blocks that are considered "hot" tend to have a frequent updated rate, while memory blocks that are considered "cold" have an update rate slower than hot blocks.

Tracking the write heat of a logical page may involve, for instance, allocating a certain number of bits in the LPT mapping entry for the page to keep track of how many write operations the page has seen in a certain time period or window. Typically, host write operations increase the write heat whereas internal relocation writes decrease the write heat. The actual increments and/or decrements to the write heat may be deterministic or probabilistic.

Similarly, read heat may be tracked with a certain number of additional bits in the LPT for each logical page. To reduce meta-data, read heat can also be tracked at a physical block level where separate counters per block for straddling and non-straddling reads can be maintained. However, it should be noted that the number of read requests to and/or read operations performed on a memory block may not come into play for heat separation when determining the heat of the memory block for some approaches. For example, if data is frequently read from a particular memory block, the high read frequency does not necessarily mean that memory block will also have a high update rate. Rather, a high frequency of read operations performed on a given memory block may denote an importance, value, etc. of the data stored in the memory block.

By grouping memory blocks of the same and/or similar write heat values, heat separation may be achieved. In particular, heat segregating methods may group hot memory pages together in certain memory blocks while cold memory pages are grouped together in separate memory blocks. Thus, a heat segregated LEB tends to be occupied by either hot or cold data. Although it would be preferrable to group data that will be invalidated approximately at the same point in time in the future from a theoretical point of view, using the update frequency to track write heat is a very good approximation as the time it takes to program a LEB is typically order of magnitudes lower than the data retention time.

The merit of heat separation is two-fold. First, performing a garbage collection process on a hot memory block will prevent triggering the relocation of cold data as well. In the absence of heat separation, updates to hot data, which are performed frequently, also results in the undesirable relocations of all cold data collocated on the same LEB as the hot data being relocated. Therefore, the write amplification incurred by performing garbage collection is much lower for approaches implementing heat separation.

Secondly, the relative heat of data can be utilized for wear leveling purposes. For example, hot data may be placed in healthier (e.g., younger) memory blocks, while cold data may be placed on less healthy (e.g., older) memory blocks relative to those healthier memory blocks. Thus, the rate at which relatively older blocks are exposed to wear is effectively slowed, thereby improving the overall endurance of a given data storage system implementing heat separation.

Write Allocation

Write allocation includes placing data of write operations into free locations of open LEBs. As soon as all pages in a LEB have been written, the LEB is closed and placed in a pool holding occupied LEBs. Typically, LEBs in the occupied pool become eligible for garbage collection. The number of open LEBs is normally limited and any LEB being closed may be replaced, either immediately or after some delay, with a fresh LEB that is being opened.

During performance, garbage collection may take place concurrently with user write operations. For example, as a user (e.g., a host) writes data to a device, the device controller may continuously perform garbage collection on LEBs with invalid data to make space for the new incoming data pages. As mentioned above, the LEBs having the garbage collection being performed thereon will often have some pages that are still valid at the time of the garbage collection operation; thus, these pages are preferably relocated (e.g., written) to a new LEB.

Again, the foregoing functions are in no way intended to limit the capabilities of any of the storage systems described and/or suggested herein. Rather, the aforementioned functions are presented by way of example, and depending on the desired approach, logic of a storage system may be configured to perform additional or alternative functions, as would be appreciated by one skilled in the art upon reading the present description.

Figures 2D, 2E:
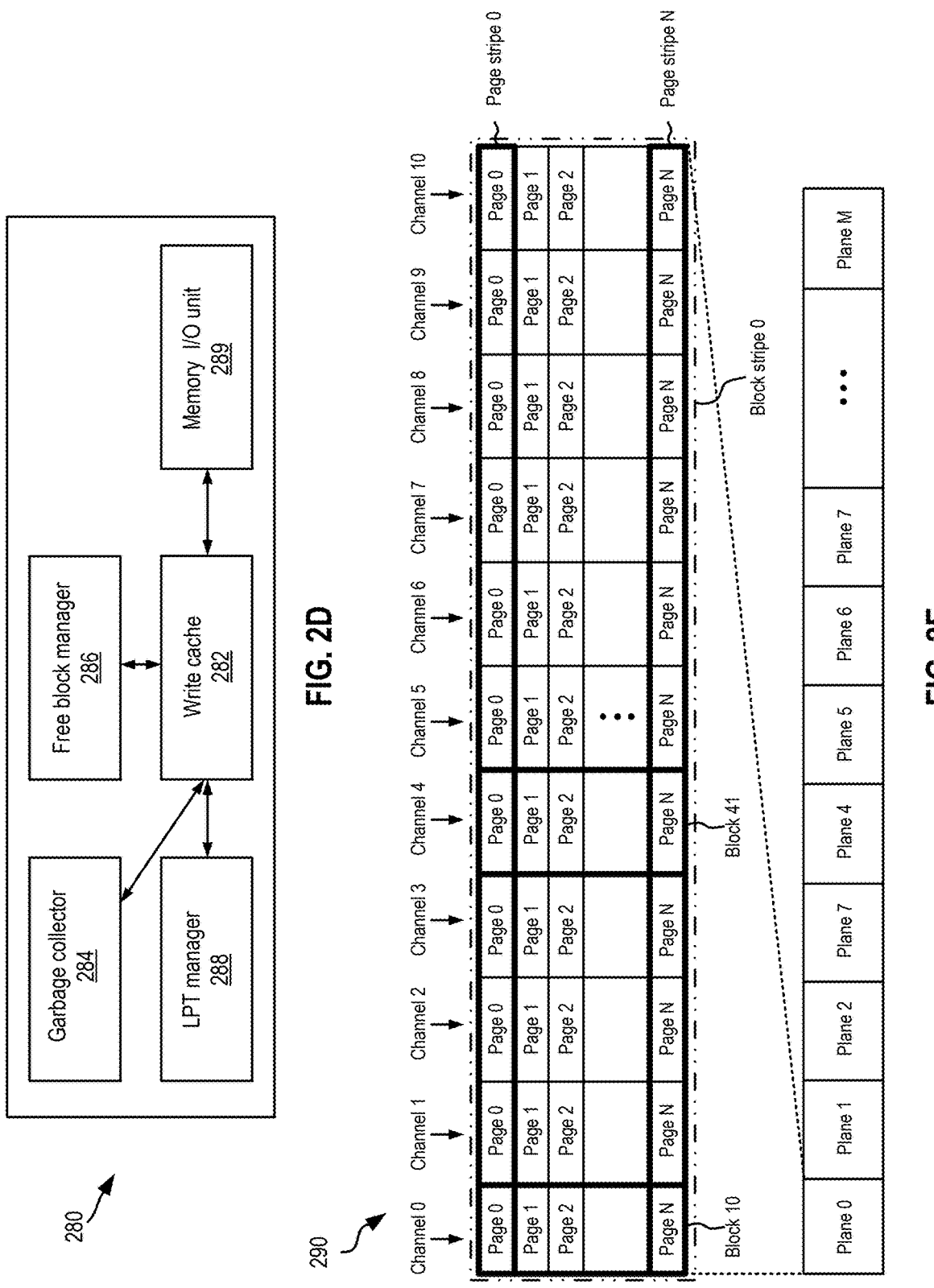
FIG. 2D is a system diagram of a non-volatile data storage card, in accordance with one approach.
FIG. 2E is a conceptual diagram which includes a block stripe and page stripe, in accordance with one approach.

Referring now to FIG. 2D, a system 280 is illustrated in accordance with one approach. As an option, the present system 280 may be implemented in conjunction with features from any other approach listed herein, such as those described with reference to the other FIGS. However, such system 280 and others presented herein may be used in various applications and/or in permutations which may or may not be specifically described in the illustrative approaches listed herein. Further, the system 280 presented herein may be used in any desired environment, e.g., in combination with a controller.

As illustrated, system 280 includes a write cache 282 which is coupled to several other components, including garbage collector 284. As previously mentioned, garbage collector 284 may be used to free LEB units by relocating valid data and providing non-volatile memory blocks to be erased for later reuse. During this process, the garbage collector 284 may read still valid pages from the selected LEB and prepare it for being written as relocation writes to new locations in the non-volatile memory. Thus, the garbage collector 284 may reclaim blocks of consecutive physical space, depending on the desired approach. According to an exemplary approach, block erase units may be used to keep track of and/or complete the erase of non-volatile memory blocks handed over by the garbage collector 284.

Write cache 282 is also coupled to free block manager 286 which may keep track of free non-volatile memory blocks after they have been erased. Moreover, as would be appreciated by one of ordinary skill in the art upon reading the present description, the free block manager 286 may build free stripes of non-volatile memory blocks from different lanes (e.g., block stripes) using the erased free non-volatile memory blocks.

Referring still to FIG. 2D, write cache 282 is coupled to LPT manager 288 and memory I/O unit 289. The LPT manager 288 maintains the logical-to-physical mappings of logical addresses to physical pages in memory. According to an example, which is in no way intended to limit the invention, the LPT manager 288 may maintain the logical-to-physical mappings of 4 KiB or 16 KiB logical addresses. The memory I/O unit 289 communicates with the memory chips in order to perform low level operations, e.g., such as reading one or more non-volatile memory pages, writing a non-volatile memory page, erasing a non-volatile memory block, etc.

To better understand the distinction between block stripes and page stripes as used herein, FIG. 2E is a conceptual diagram 290, in accordance with one approach. LEBs are built from block stripes and typically a single block stripe is used to build a LEB. However, alternative approaches may use multiple block stripes to form an LEB. As used herein, the term "block stripe" may include a desired number of blocks that are included in one or more planes of memory. In some approaches, a block stripe may include two or more blocks from a single plane of memory. In other approaches, a block stipe includes one or more block from two or more (e.g., all) of the planes in memory. It follows that the term "block stripe" as used herein may vary in size and/or scope as desired, and may thereby extend across a desired number of planes or stripes, which is in no way intended to be limiting.

As an option, the present conceptual diagram 290 may be implemented in conjunction with features from any other approach listed herein, such as those described with reference to the other FIGS. However, such conceptual diagram 290 and others presented herein may be used in various applications and/or in permutations which may or may not be specifically described in the illustrative approaches listed herein. Further, the controller conceptual diagram 290 presented herein may be used in any desired environment. Thus, the exemplary non-volatile memory controller conceptual diagram 290 of FIG. 2E may be implemented in a cache architecture. However, depending on the desired approach, the conceptual diagram 290 of FIG. 2E may be implemented in defining the organization of data stored in non-volatile memory. Accordingly, both implementations are described in turn below.

Non-Volatile Memory

Looking now to FIG. 2E, the conceptual diagram 290 includes a set of M+1 aggregated planes labeled "Plane 0" through "Plane M". An aggregated plane consists of all physical planes with the same plane index on different channels. It should be noted that aggregated planes are also referred to herein simply as planes.

When implemented with data stored in non-volatile memory, each physical plane on a channel may include a large set of blocks, e.g., typically in the order of 1024, 2048 or more. Moreover, one or more physical planes may also include several additional blocks which may be used as replacement blocks for bad blocks (e.g., blocks performing poorly, blocks having undesirable characteristics, etc.).

In each plane of non-volatile memory, a single block from each channel may form a respective block stripe. It follows that a number of block stripes supported by a given approach of non-volatile memory may be determined by the number of blocks per plane and the number of planes. In other embodiments, a block stripe may be formed from M blocks from each plane and each channel, hence building a block stripe using blocks from all planes. Block stripes could also be formed by taking blocks from a subset of the planes correspondingly.

In the exploded view of Plane 0, the conceptual diagram 290 further illustrates a single block stripe (Block stripe 0) out of the set of block stripes supported in the remainder of the planes. Block stripe 0 of plane 0 is shown as including 11 blocks, one block from each channel labeled "Channel 0" through "Channel 10". Similarly, blocks from multiple or all planes and from each channel may from a single block stripe (not shown in FIG. 2E). It should be noted that the association of blocks to block stripe can change over time as block stripes are typically dissolved after they have been garbage collected. Erased blocks may be placed in free block pools, whereby new block stripes are assembled from blocks in the free block pools when write allocation requests fresh block stripes. For example, looking to conceptual diagram 290, Block 10 from Channel 0 and Block 41 from Channel 4 are currently associated with the illustrated Block stripe 0 of Plane 0. Furthermore, the illustrated Block stripe 0 holds N+1 page stripes and each block therefore holds N+1 pages labeled "Page 0" through "Page N". Each page stripe holds C pages where C corresponds to the number of channels. Similarly, a block stripe formed with all planes holds M*(N+ 1) page stripes where each page stripes holds C pages and consists of blocks with the same plane index on all channels. Alternatively, a block stripe formed with all planes may also hold N+1 pages stripes where each page stripe holds M*C pages. Using RAID parity in each page stripe different data protection levels can be achieved with these data placement options that will be apparent to one skilled in the art upon reading the present disclosure.

Cache Architecture

Referring still to FIG. 2E, each block of pages illustrated in the exploded view of aggregated Plane 0 may constitute a unique block from one channel when implemented in a cache architecture. Similarly, each channel contributes a single, individual block which form a block stripe. For example, looking to conceptual diagram 290, Block 10 from Channel 0 includes all pages (Page 0 through Page N) therein, while Block 41 from Channel 4 corresponds to all pages therein, and so on.

In the context of a memory controller, e.g., which may be capable of implementing RAID at the channel level, a block stripe is made up of multiple blocks which amount to a stripe of blocks. Looking still to FIG. 2E, the multiple blocks of aggregated Plane 0 constitute Block stripe 0. While all blocks in a block stripe typically belong to the same aggregated plane, in some approaches one or more blocks of a block stripe may belong to different physical planes. It follows that each aggregated plane may include one or more block stripes. Thus, according to an illustrative approach, Block 0 through Block 10 from different physical planes may constitute a block stripe.

Regardless of whether the conceptual diagram 290 of FIG. 2E is implemented with non-volatile memory and/or a cache architecture, in different approaches, the number of pages in each block and/or the number of planes in each die and/or the number of channels in each data storage card may vary depending on the desired approach. According to an exemplary approach, which is in no way intended to limit the invention, a block may include several thousands of pages, but could include more or fewer in various approaches. Analogously, the number of channels in the data storage card and/or the number of planes may vary depending on the desired approach.

Referring still to FIG. 2E, all pages in a block stripe with the same page index denote a page stripe. For example, Page stripe 0 includes the first page (Page 0) of each channel in Block stripe 0 of Plane 0. Similarly, Page stripe N includes the last page (Page N) of each channel in Block stripe 0 of Plane 0.

Once again, storing data in an efficient and effective manner has become increasingly difficult to achieve for conventional products. For instance, as data production continues to increase, the process of writing the greater amounts of data to memory has become more resource intensive over time. In sharp contrast, approaches herein include novel non-volatile memory controller capabilities which overcome the conventional shortcomings. For example, by separating different kinds of writes (e.g., host writes from relocation writes), approaches herein are able to significantly reduce the write amplification experienced during runtime. Moreover, by separating different write streams (e.g., write sources) based at least in part on their respective write heat, approaches herein are further able to reduce write amplification. For instance, the number of relocation writes performed is reduced by co-locating data of the same or similar type and/or heat in page stripes of the memory.

Figure 3:
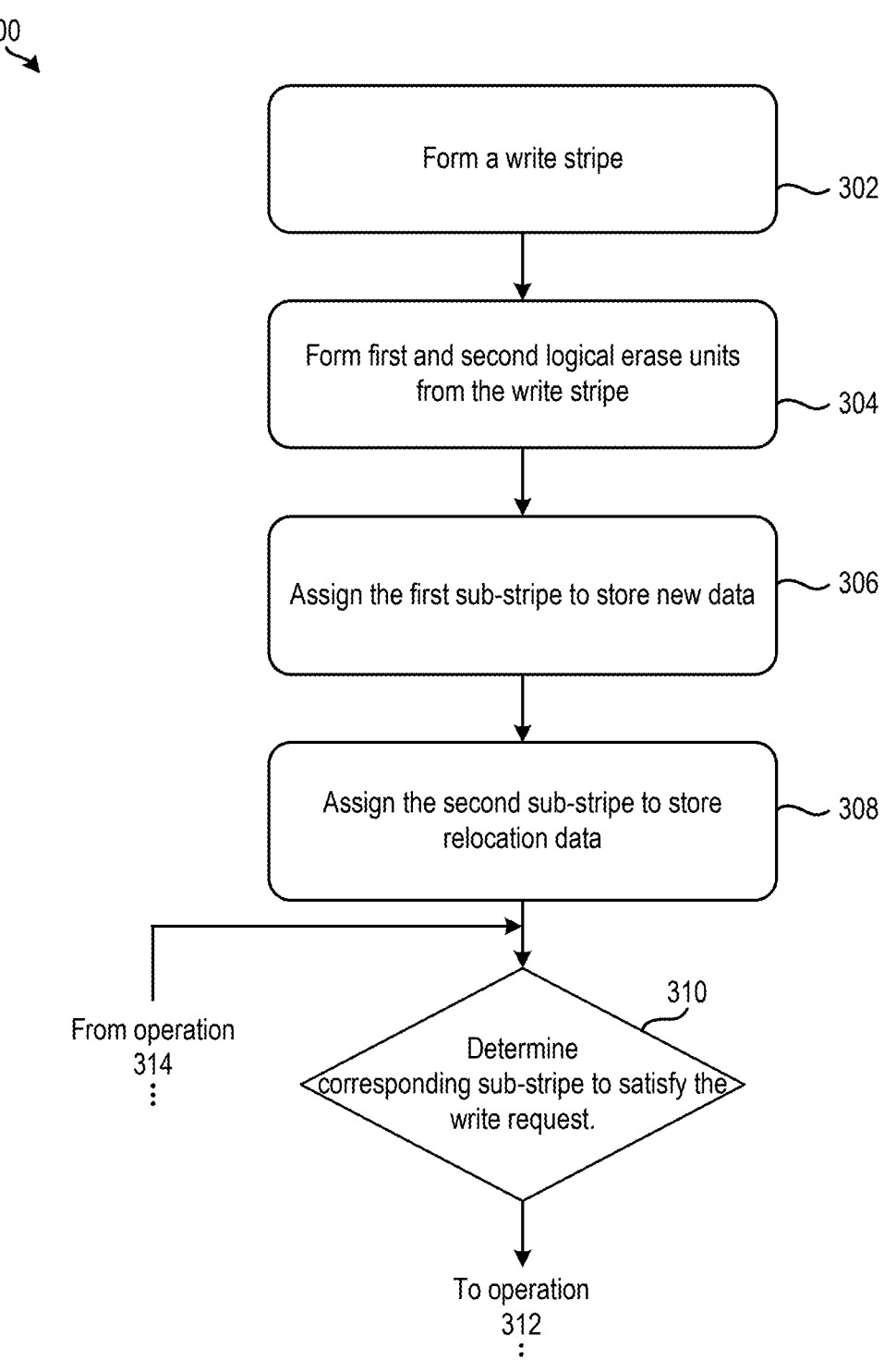
FIG. 3 is a flowchart of a method, in accordance with one approach.
Figure 3:
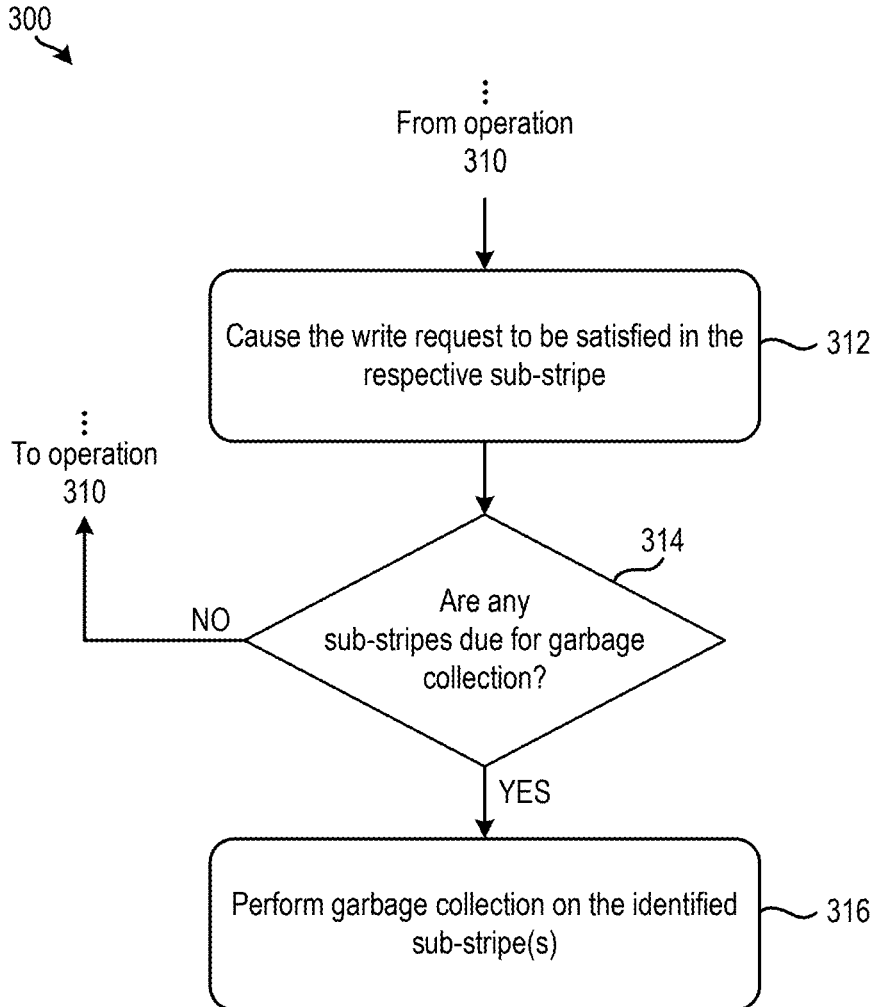

Looking now to FIG. 3, a flowchart of a method 300 for organizing blocks in a non-volatile storage controller using multiple planes, is illustrated in accordance with one approach. Approaches herein are thereby able to overcome the foregoing conventional shortcomings. For example, by separating different kinds of writes (e.g., host writes from relocation writes), approaches herein are able to significantly reduce the write amplification experienced during runtime. Moreover, by separating different write streams (e.g., write sources) based at least in part on their respective write heat and/or NVME stream or namespace identifier, and/or NVME Flexible Data Placement (FD) Reclaim Unit Handler (RUH), approaches herein are further able to reduce write amplification. For instance, the number of relocation writes performed is reduced by co-locating data of the same or similar type and/or heat in page stripes of the memory. Furthermore, by successfully adding parity information to the data stored in memory, approaches herein are desirably able to improve data retention while reducing write overhead, e.g., as will be described in further detail below.

The method 300 may be performed in accordance with the present invention in any of the environments depicted in FIGS. 1-2E, among others, in various approaches. For instance, one or more operations in method 300 may be performed by components in the edge node 204 and/or central server 202 of FIG. 2A. Moreover, more or less operations than those specifically described in FIG. 3 may be included in method 300, as would be understood by one of skill in the art upon reading the present descriptions.

Each of the steps of the method 300 may be performed by any suitable component of the operating environment using known techniques and/or techniques that would become readily apparent to one skilled in the art upon reading the present disclosure. In preferred approaches, one or more of the operations in method 300 are performed by one or more processors, controllers, control units, etc., that are included in the camera capturing the videos being edited. While various operations in method 300 are thereby described in the context of a video stream being edited in real-time at the camera, the video stream may be transmitted elsewhere and edited in real-time before being stored in memory. In other approaches, the method 300 may be partially or entirely performed by a controller, a processor (e.g., see processor 212 and/or 216 of FIG. 2A), one or more machine learning models, etc., or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, operation 302 of method 300 includes forming a write stripe. The write stripe identifies the physical memory locations that data may be stored (e.g., written to). Operation 302 thereby effectively includes defining the boundaries in which data may be stored. The write stripe may thereby correspond to the pages included in (e.g., identified by) a given block stripe. While the process of forming the write stripe may vary depending on the implementation, the resulting write stripe that is formed may be represented in (e.g., added to) the write cache and prepared for being associated to a write stream.

In some approaches, the write stripe extends across a single plane in the non-volatile memory. In such approaches, each plane in memory may incorporate the same, similar, or different configuration of sub-stripes, and thereby store different arrangements of data. The write stripe formed in operation 302 may thereby incorporate a single block from each channel in a respective plane. In other approaches, the write stripe may extend across more than one plane in the non-volatile memory. In such approaches, each plane in memory may incorporate the same, similar, or different configuration of sub-stripes, and thereby store different arrangements of data. The write stripe formed in operation 302 may thereby incorporate more than one block from each channel in different planes, e.g., as will be described in further detail below.

In response to forming the write stripe, method 300 advances from operation 302 to operation 304. There, operation 304 includes forming first and second logical erase units from the write stripe. The logic erase units are each preferably formed by grouping specific blocks from the formed write stripe into at least first and second sub-stripes. The blocks in at least the first sub-stripe may thereby be grouped together and correlated with the first logical erase unit, while the blocks in at least the second sub-stripe may be grouped together and correlated with the second logical erase unit. This allows for different portions of the same stripe or plane in memory to be garbage collected without impacting a remainder of the stripe or plane. For example, the blocks in Channel 0 through Channel 4 of Plane 0 may be garbage collected without affecting the blocks in Channel 5 through Channel 10 of Plane 0. This is a significant improvement over conventional products which are forced to garbage collect on a much larger scale, resulting in significantly higher compute overhead. For instance, stripes can be formed from a single block from each channel in each plane of non-volatile memory blocks from or from one block of each plane from each channel or from a subset of the same planes by selecting a block from each subset of the planes from each channel. To simplify the description the term stripe is used for any of these configurations in the description below.

Grouping the blocks in a stripe or plane of memory into two different sub-stripes also allows for two different write streams to be stored therein. For instance, at least a first write stream may be stored in (written to) the blocks of a first sub-stripe, while a second write stream may be stored in the blocks of the second sub-stripe. Writing two or more streams of data to distinct logical erase units may further be done in parallel, increasing the achievable throughput. While the particular configuration (e.g., size) of the groups of blocks may differ depending on the approach, both sub-stripes preferably include a portion of the blocks that are in each page stripe of a stripe or plane in the write stripe. In other words, the first sub-stripe may include the blocks in at least one of the channels in a stripe or plane of memory, while the second sub-stripe includes the blocks in the remainder of the channels in the stripe or plane of memory. Thus, data may be written to blocks in different channels of the same stripe or plane, in parallel.

The number of blocks that are included in each of the sub-stripes, and thereby allocated to each of the respective logic erase units, may be adjusted as desired. For instance, performing a garbage collection operation on a complete stripe or plane of memory (i.e., on both sub-stripes), the number of channels that are assigned to each sub-stripe therein may be adjusted. However, the sub-page stripes (i.e., stripes of pages from a sub-stripe of blocks) that are in a same sub-stripe are each preferably the same (e.g., uniform) size and do not overlap with sub-page stripes from a different sub-stripe. Thus, each sub-page stripe in the first sub-stripe is about (e.g., in some percentage based tolerance) a same first size, while the sub-page stripes in the second sub-stripe are each about a same second size. Accordingly, new data may be written to a first sub-page stripe in a first sub-stripe of memory, in parallel with writing relocation data in a first sub-page stripe of a second sub-stripe in memory. Moreover, the first sub-page stripe in the first sub-stripe has a same page index as the first sub-page stripe in the second sub-stripe. Again, while the size of the sub-stripes and sub-page stripes therein may be fixed during use, they may be adjusted following a garbage collection operation.

In some approaches, the number of blocks in each of the sub-stripes is set following a garbage collection operation, to reflect the rate that data is being received. In one example, a first stream of write data (also referred to herein as a "write stream") may be faster (e.g., hotter) than a second stream of write data. In this example, following a garbage collection operation being performed on an overarching stripe or plane, the first write stream may be allocated a greater number of blocks in the stripe or plane than the second, slower write stream. The first write stream may be written across sub-page stripes that are longer (i.e., include more blocks from more channels) than the shorter sub-page stripes that the second write stream is written to. The sizes (e.g., length or number of blocks included therein) of the sub-page stripes in the respective first and second sub-stripes are thereby set based at least in part on a measured write amplification. Adjusting the size of the sub-stripes based on the rate that data is received in this manner allows for full sub-page stripes in corresponding page stripes to be filled at about the same time. In other words, pages of both sub-page stripes with the same page index in the blocks are preferably written concurrently as soon as the data is ready to be programmed. Hence the page indexes being currently written to in a stripe are the same or very close to each other (e.g., $+/-1$) such that the page indexes on each channel/plane advances at the same speed throughout the programming of the stripe despite data being separated into sub-stripes with different (heat) characteristics. In other words, the write process continues with the next sub-page stripes with page index $i+1$ from the sub-block stripes when writes to all pages of the current page index i have been allocated and or started to be programmed. In turn, this improves throughput of the memory as a whole.

In other approaches, the number of blocks in each of the sub-stripes is correlated with a type of data being written thereto. Different types of data may be received from different locations, at different rates, with different write instructions, etc., depending on the approach. These differences may be reflected in the size, arrangement, number, etc., of the sub-stripes that are formed from a given write stripe, as will be described in further detail below (e.g., see FIGS. 4A-4F). As noted above, correlating (e.g., mapping) the logic erase units with specific blocks in a given stripe or plane of memory allows for specific sections of the stripe or plane to be modified independent of each other. This improves the granularity of memory and access to data therein, e.g., as would be appreciated by one skilled in the art after reading the present description.

In other approaches, the write stripe extends across at least two planes of the non-volatile storage. In such approaches, each of the planes are preferably divided into two or more respective sub-stripes. Thus, write stripe extending across two planes may be divided into a first sub-stripe which includes sub-page stripes in each page stripe of the first plane and sub-page stripes in each page stripe of the second plane; and a second sub-stripe which includes sub-page stripes in each page stripe of the first plane and sub-page stripes in each page stripe of the second plane (e.g., see FIGS. 4D-4F). Data and/or RAID parity may be written to the sub-page stripes of the respective first and second sub-stripes in a round robin order in some approaches. Writing in a round robin order allows for the memory to distribute the wear associated with performing the writes evenly across the pages in memory as the allocation of sub-stripes to each stream will allocate blocks from all channels and planes evenly over time. Consequently, at one point in time concurrent writes will go to one single plane on each channel. For example, data may be written to one half of the extended stripe before switching to the other half, thereby avoiding having potentially two concurrent writes going to the same plane when separate write stripes would be used. In approaches where a stripe includes blocks from multiple (e.g., all) planes in memory, instead of extending over two planes, two different blocks from each plane can be used to extend the write stripe.

With continued reference to FIG. 3, method 300 advances from operation 304 to operation 306. There, operation 306 includes assigning the first sub-stripe to store new data (only), while operation 308 includes assigning the second sub-stripe to store relocation data (only). In other words, the first sub-stripe is allocated (e.g., configured) such that it is only able to store new data (e.g., host writes) received along a first write stream. However, it should be noted that in situations where the write amplification exceeds a threshold and/or strays outside a predetermined range, different types of data may be written to the memory in a mixed manner, e.g., until the write amplification subsides.

Moreover, the second sub-stripe is allocated such that it is only used to store preexisting data (e.g., valid data relocated from LEBs that are garbage collected) received along a second write stream. As a result, any new data writes received along the first write stream is routed and written to the first sub-stripe, while all data relocation writes received along the second write stream is sent to the second sub-stripe and written to the corresponding blocks.

It should also be noted that the sub-stripes are allocated and assigned in operations 306 and 308 to respective data streams such that data is written to each of the sub-stripes one sub-page stripe at a time. In other words, data is written to a sub-stripe by filling a block in each sequential channel of a sub-page stripe, before moving to a subsequent sub-page stripe in the same sub-stripe. This desirably ensures that each block of memory is utilized. RAID parity may also be implemented in some of the blocks of memory. For instance, data may be written to memory such that each of the sub-page stripes include a RAID parity page (e.g., see FIG. 4A below). In other approaches, data may be written to memory such that each pair (or larger subset) of the sub-page stripes in a same one of the sub-stripes includes a RAID parity page (e.g., see FIG. 4B below). However, RAID parity may be implemented in the blocks of the sub-stripes across any desired number of planes in memory. For example, RAID parity may be written to select blocks in at least some of the sub-page stripes of the sub-stripes in a round-robin fashion (e.g., see FIG. 4F below).

With continued reference to FIG. 3, it follows that the first and second sub-stripes are configured to store specific types and amounts of data as a result of performing operations 306 and 308. As noted above, operations 302, 304, 306, 308 may be performed each time a garbage collection operation is performed on a LEB of memory, where a LEB here corresponds to a sub-stripe. It follows that multiple LEBs are collocated within a stripe. However, it should be noted that operations 302, 304, 306, 308 may be performed during an initial setup of the memory, in response to receiving a request from a user, in response to one or more predetermined conditions being met (e.g., a threshold number of invalid pages being located in a plane), etc. Moreover, while performing garbage collection on a LEB allows for the sub-stripes to be reallocated as desired, the sub-stripes themselves are each correlated with a respective logical erase unit. Again, this desirably allows for the sub-stripes to each be garbage collected independently of the other blocks in a same stripe.

Proceeding now to operation 310, there method 300 includes determining a corresponding sub-stripe to satisfy the write request(s). Accordingly, the incoming write requests are preferably monitored, and a determination is made as to whether any are directed to (e.g., have target locations in) the formed sub-stripes. In response to identifying the sub-stripe that a given write request is directed to, method 300 advances to operation 312. There, operation 312 includes causing the write request to be satisfied in the respective sub-stripe(s) that has/have been identified. For instance, a stream of new host data writes is directed to the first sub-stripe and written thereto, while a stream of relocation data writes is directed to the second sub-stripe and written. Moreover, writing data to the respective sub-stripes is preferably performed sub-page stripe by sub-page stripe, e.g., as will soon become apparent.

In some approaches, operation 312 may be performed by sending one or more instructions that ultimately cause new data to be written to a first sub-page stripe in the first sub-stripe in parallel (e.g., concurrently, simultaneously, etc.) with causing relocation data to be written to a first sub-page stripe in the second sub-stripe. For instance, new data is written to pages in the first sub-page stripe of the first sub-stripe that have a same index as pages in the first sub-page stripe in the second sub-stripe. In other words, operation 312 includes writing different streams (e.g., types) of data to pages in memory that have a same index. In some instances, the different write streams are written to opposite sides of a same page stripe having pages with the same index. Moreover, in response to filling the first sub-page stripe of the first sub-stripe as well as the first sub-page stripe in the second sub-stripe (e.g., at about the same time), additional data from the streams may be written to sub-page stripes having a subsequent index number.

One or more instructions may be sent that result in data of the received write request being written to pages in the blocks of the respective sub-stripe. It should be noted that data is written to a given sub-stripe of non-volatile memory in its entirety. Accordingly, write requests (e.g., write streams) may be combined to fill a given sub-stripe of memory. For example, a write buffer may accumulate data to be written to a sub-stripe and actually write the data to memory in response to a desired amount being collected, e.g., as would be appreciated by one skilled in the art after reading the present description.

From operation 312, method 300 advances to operation 314. There, operation 314 determines whether any sub-stripes of memory are due for garbage collection. In other words, operation 314 involves inspecting (e.g., monitoring) each of the sub-stripes and determining whether any have a number of invalid pages of data therein that is outside a predetermined range. According to a non-limiting example, a sub-stripe with more than 1%, 2%, 3%, 4%, 5%, 10%, 20%, 25%, 30%, 45%, 50%, 60%, 70%, 80%, 90%, 95%, etc., of the pages therein as being invalid may be identified as being a prime candidate for garbage collection.

As noted above, pages in corresponding sub-page stripes having the same page index in the blocks are preferably written concurrently. Consequently, concurrent writes may be sent to different sub-page stripes in a single plane on each channel. For example, data may be written to one half of a page stripe (e.g., a first sub-page stripe) before writing data to a second half of the page stripe (e.g., a second sub-page stripe). This desirably avoids having two concurrent writes potentially being directed to the same stripe or plane in situations where separate write stripes would be used. It follows that writing data to the sub-page stripes in a same page stripe are synced in the sense that the controller concurrently writes data to pages in the respective sub-page stripes that have a same page index. Thus, in response to data (e.g., host writes) being written into a respective sub-page stripe, a corresponding number of pages are preferably selected from a different location (e.g., a sub-stripe currently selected to be cleaned by garbage collection) and added to the corresponding sub-page stripe in the same stripe that garbage collected data is placed.

In response to determining that none of the sub-stripes of memory are ready for garbage collection, method 300 returns to operation 310 from operation 314. This allows for the incoming requests to continue to be monitored and directed to the appropriate sub-stripes in memory. Operations 310, 312, and 314 may thereby be repeated iteratively over time as write requests are received and performed by writing data to the sub-stripes of memory.

However, method 300 advances from operation 314 to operation 316 in response to determining that a garbage collection operation is due. The determination made in operation 314 may thereby be based at least in part on the number of invalid pages that are in each respective sub-stripe. There, operation 316 includes performing garbage collection on the sub-stripe(s) identified in operation 314. In situations where only one sub-stripe in a stripe or plane is identified as being ready for garbage collection, the fact that each sub-stripe is correlated with a respective logic erase unit allows for the sub-stripes to be garbage collected individually. Thus, the identified sub-stripe may be garbage collected in operation 316 while the remaining sub-stripe(s) in the same stripe or plane are not. Again, this desirably allows for write amplification to be significantly reduced by decreasing the amount of data rewrites that are performed. In situations where both (e.g., all) of the sub-stripes in a stripe or plane are identified as being ready for garbage collection, operation 316 includes garbage collecting the entire plane of memory. As noted above, this desirably allows for the sub-stripes in the stripe to be reallocated as desired. For example, the sub-stripes may be resized based on data rates, data types, data sources, user instructions, etc. In other approaches, the blocks of pages in memory may be reallocated to evenly distribute wear across the physical memory.

In some approaches, method 300 returns to operation 302 following the garbage collection in operation 316. For instance, the sub-stripes may be reallocated in situations where a full stripe of memory is garbage collected in operation 316. Operations 302, 304, 306, 308 may thereby be repeated to prepare the memory plane for storing data therein. However, method 300 may return to operation 310 in response to performing operation 316 in some situations. For example, garbage collecting less than a full stripe or plane of memory does not impact the remaining data stored therein. Garbage collecting only one sub-stripe thereby does not impact the remaining sub-stripes and incoming requests may continue to be monitored and performed. Blocks that have been garbage collected in sub-stripes are made available to build new stripes and sub-stripes. In still other approaches, the garbage collected sub-stripe(s) may be added to a list of available sub-stripes that may be used to satisfy received write requests.

It should also be noted that although method 300 is described in the context of forming two sub-stripes and corresponding logic erase units on a given plane of memory, this is in no way intended to be limiting. In other approaches, a stripe of memory that extends across one or more planes may be divided into three or more sub-stripes. Again, the number, size, type, etc., of the sub-stripes that are in a given stripe of memory may be reset in response to garbage collecting a full plane of memory. Similarly, while operation 314 is illustrated as inspecting stripes of memory for sub-stripes that are ready for garbage collection on each iteration of the operations in method 300, this is in no way intended to be limiting either. Rather, the sub-stripes may be evaluated for garbage collection candidates periodically, in response to a predetermined condition being met (e.g., a predetermined number of write operations being satisfied, a predetermined number of write failures being experienced in a sub-stripe, a predetermined number of read failures being experienced in a sub-stripe, etc.), in response to receiving instructions from an administrator, etc.

Furthermore, although the operations of method 300 are illustrated as being initiated prior to receiving write streams to store therein, on other approaches the sub-stripes and/or logical erase units may be allocated in response to receiving one or more write streams. For example, in response to a write stream having new data writes therein being received from a host, a stream of relocation writes being received from a garbage collection module, sensor data being received from external devices periodically, etc. and/or combinations thereof, one or more of the operations in method 300 may be performed.

Looking now to FIGS. 4A-4F, stripes of non-volatile memory with different configurations of sub-stripes are illustrated in accordance with several in-use examples, which are in no way intended to be limiting. As introduced above, the stripes may be formed from blocks of a single plane or all planes, which again is in no way intended to be limiting. For better readability, FIGS. 4A-4E only show a single plane being used to build a stripe. Any of the in-use examples illustrated in FIGS. 4A-4F may be implemented in conjunction with features from any other approach listed herein, such as those described with reference to the other FIGS., e.g., such as FIG. 3. However, such configurations and others presented herein may be used in various applications and/or in permutations which may or may not be specifically described in the illustrative approaches or implementations listed herein. Thus FIGS. 4A-4F (and the other FIGS.) may be deemed to include any possible permutation.

Figure 4A:
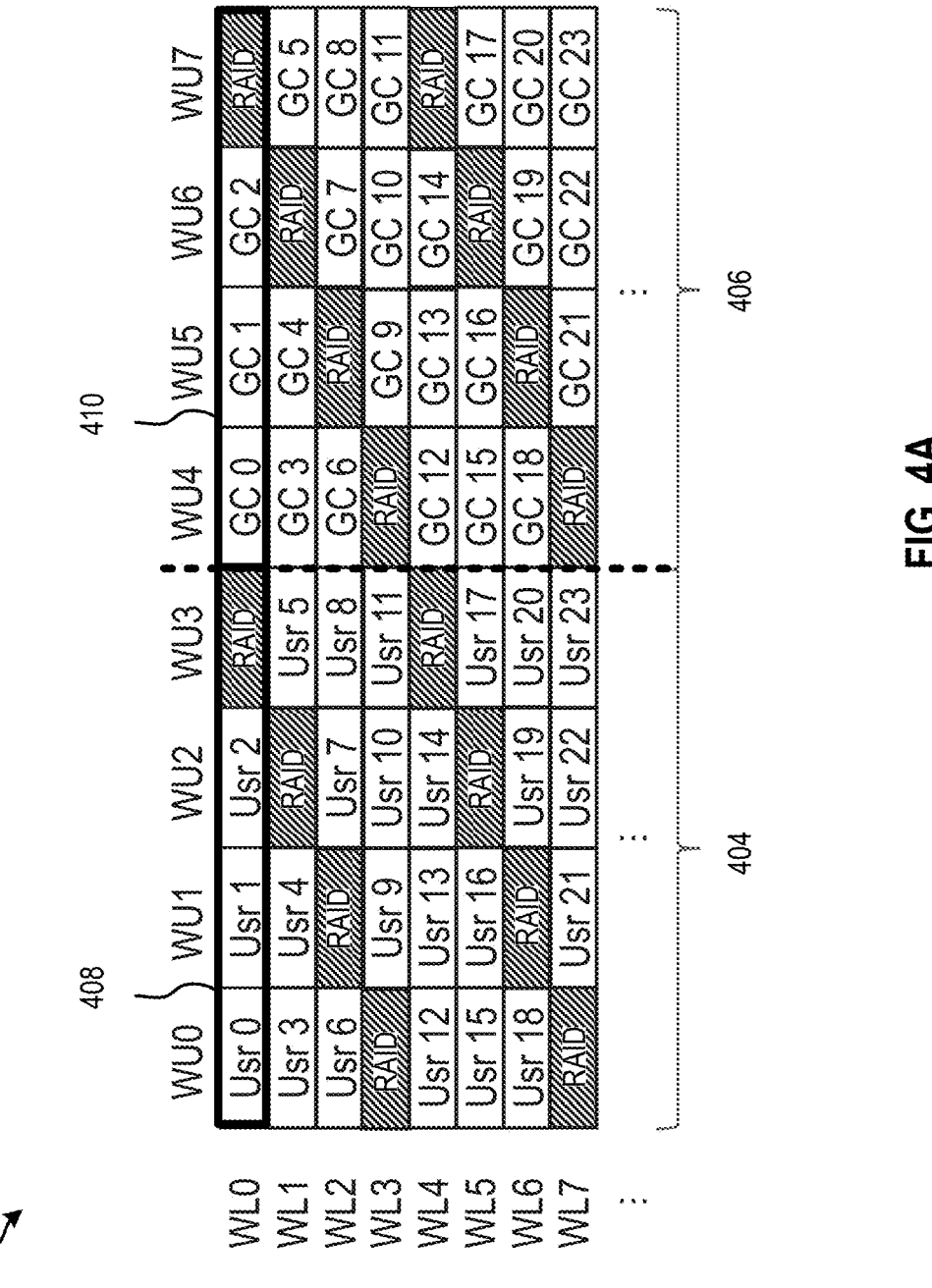
FIG. 4A is a representational view of a stripe of non-volatile memory with sub-stripes allocated therein, in accordance with an in-use example.

Looking first to FIG. 4A, there a stripe 402 of non-volatile memory has been divided into two sub-stripes 404, 406. Sub-stripe 404 has blocks denoted as write units WU0, W01, WU2, and WU3 associated, and sub stripe 406 write units WU4, WU5, WU6, and WU7 associated where the notion of write unit WUx denotes any block from channel x. A first of the sub-stripes 404 is assigned to store user writes, while the second sub-stripe 406 is assigned to store relocation writes. Accordingly, sub-stripe 404 is shown as including user data Usr 0, Usr 1, Usr 2, Usr 3, etc. (e.g., host data) in a number of the pages therein. Conversely, sub-stripe 406 is also shown as including garbage collection writes GC 0, GC 1, GC 2, GC 3, etc. (e.g., relocation writes).

The sub-stripes 404, 406 also include RAID parity data in each of the sub-page stripes therein. For instance, sub-page stripe 408 includes RAID parity data in the page in the fourth block WU3 of the stripe 402. Moreover, sub-page stripe 410 includes RAID parity data in the page in the eighth block WU7 of the stripe 402. While each of the physical sub-page stripes include a RAID parity page, the present configuration also shifts the specific page in the sub-page stripe that is used to store the parity data. This desirably protects the user data and relocation data in each of the respective sub-stripes from experiencing write unit failures. Moreover, by separating user writes and relocation writes into different sub-stripes that are correlated with different logic erase units, the data in one sub-stripe may be modified (e.g., garbage collected and rewritten) without impacting the data in the other sub-stripe(s).

Figure 4B:
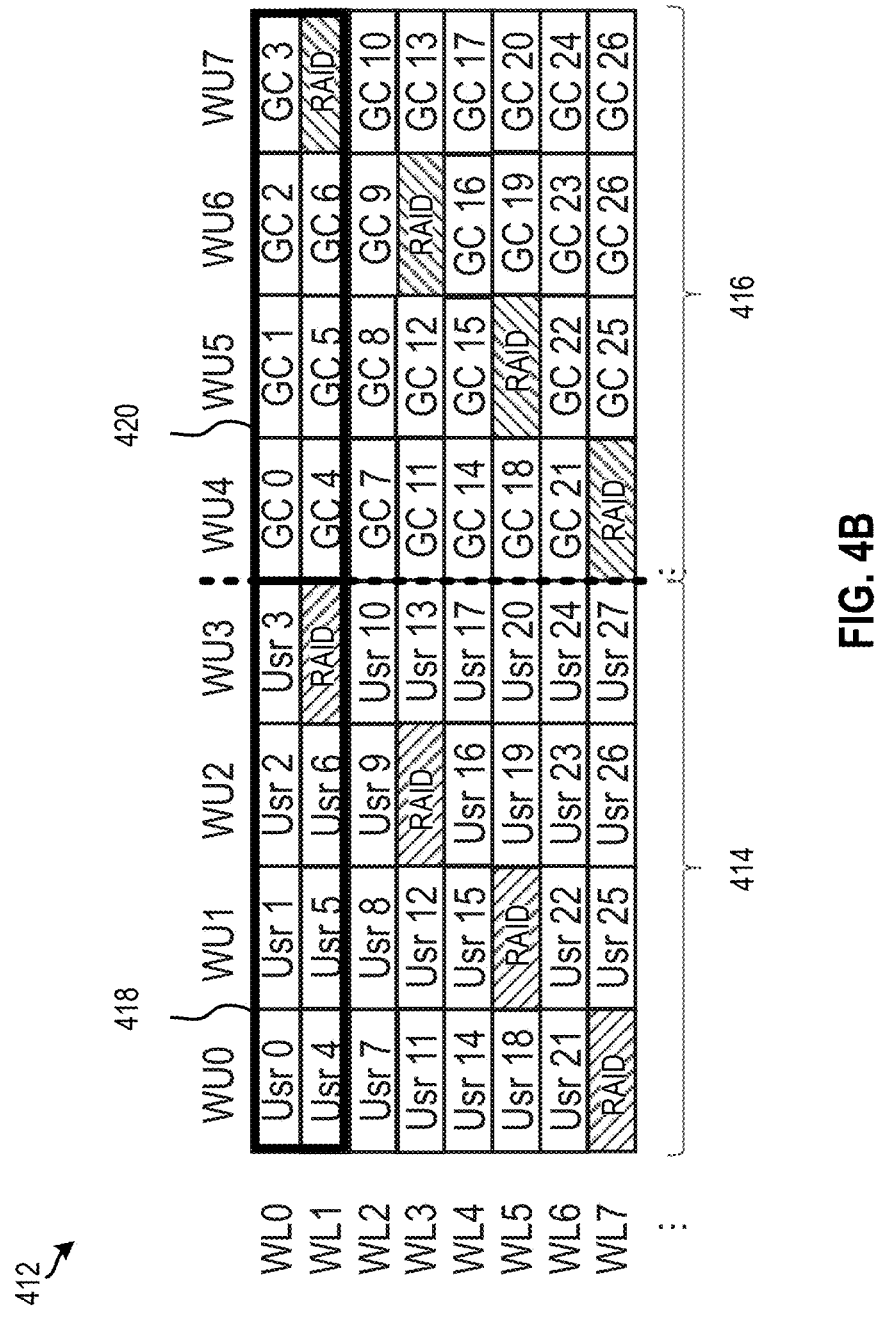
FIG. 4B is a representational view of a stripe of non-volatile memory with sub-stripes allocated therein, in accordance with an in-use example.

Looking now to FIG. 4B, there a stripe 412 of non-volatile memory has been divided into two sub-stripes 414, 416. As noted above, a first of the sub-stripes 414 is assigned to store user writes, while the second sub-stripe 416 is assigned to store relocation writes. Accordingly, sub-stripe 414 is shown as including user data Usr 0, Usr 1, Usr 2, Usr 3, etc. (e.g., host data) in a number of the pages therein. Conversely, sub-stripe 416 is also shown as including garbage collection writes GC 0, GC 1, GC 2, GC 3, etc. (e.g., relocation writes).

The sub-stripes 414, 416 also include RAID parity data in each of the sub-page stripes therein. Moreover, each sub-page stripe in the present configuration includes two sub-page stripes therein. In other words, each pair (e.g., subset) of the physical sub-page stripes in a same one of the sub-stripes includes a RAID parity page. For instance, sub-page stripe 418 includes pages that are located in page stripes WL0, WL1, with RAID parity data in the page in the fourth block WU3 of the stripe 412. Sub-page stripe 420 also includes pages that are located in page stripes WL0, WL1, with RAID parity data in the page in the eighth block WU7 of the stripe 412. While each pair of sub-page stripes in the physical sub-page stripes include a RAID parity page, the present configuration also shifts the specific page in the sub-page stripe that is used to store the parity data. Moreover, by separating user writes and relocation writes into different sub-stripes that are correlated with different logic erase units, the data in one sub-stripe may be modified (e.g., garbage collected and rewritten) without impacting the data in the other sub-stripe(s). Note that in another embodiment, WL0 and WL1 (and correspondingly WL2 and WL3 etc.) could belong to the same word line, but associated to different planes.

Figure 4C:
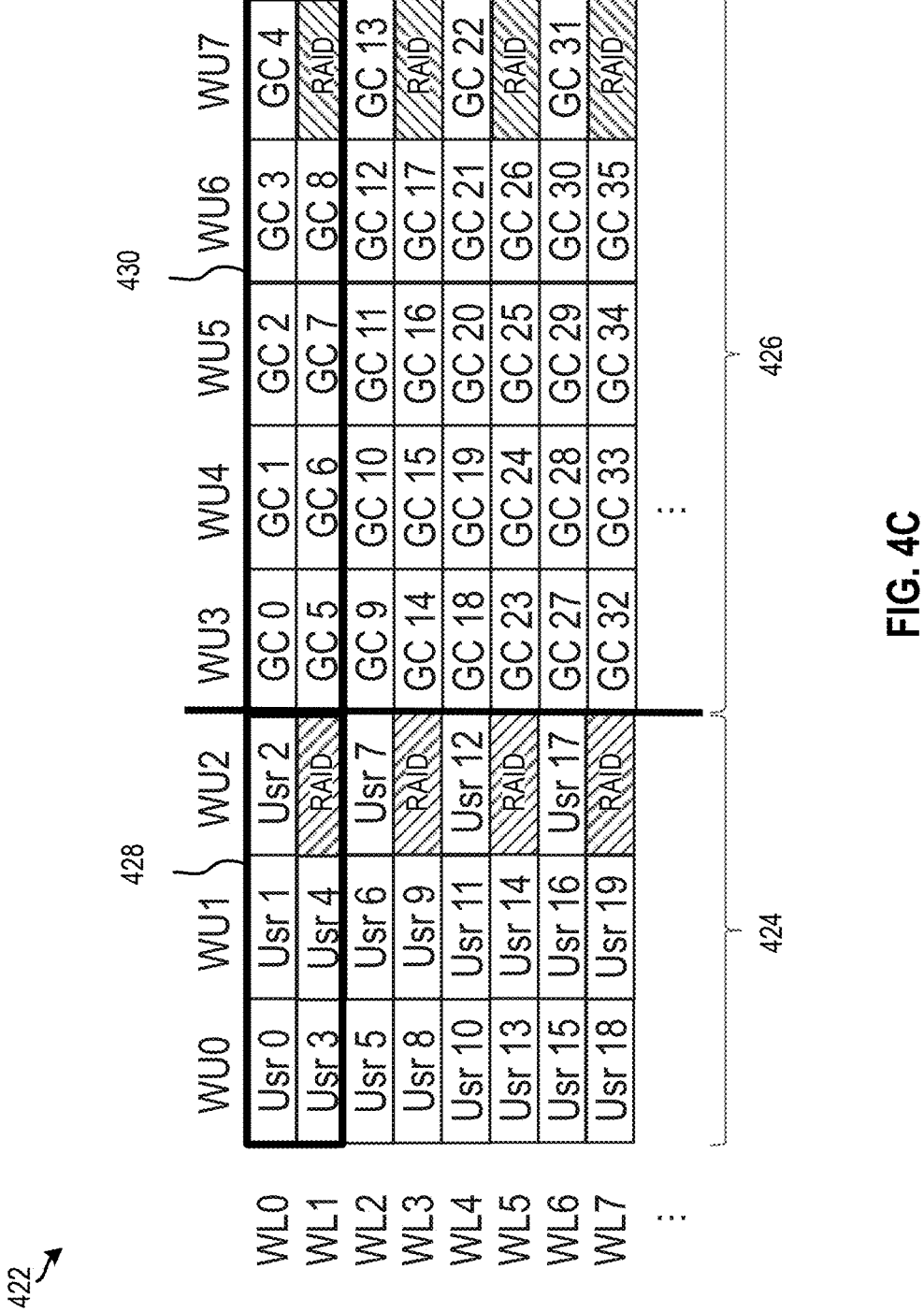
FIG. 4C is a representational view of a stripe of non-volatile memory with sub-stripes allocated therein, in accordance with an in-use example.

Looking now to FIG. 4C, there a plane 422 of non-volatile memory has been divided into two sub-stripes 424, 426. As noted above, a first of the sub-stripes 424 is assigned to store user writes, while the second sub-stripe 426 is assigned to store relocation writes. Accordingly, sub-stripe 424 is shown as including user data Usr 0, Usr 1, Usr 2, Usr 3, etc. (e.g., host data) in a number of the pages therein. Conversely, sub-stripe 426 is also shown as including garbage collection writes GC 0, GC 1, GC 2, GC 3, etc. (e.g., relocation writes). However, the sub-stripes 424, 426 have been allocated such that their respective sub-page stripes are of different lengths. Specifically, sub-stripe 424 includes three blocks WU0, WU1, WU2 of the stripe, while sub-stripe 426 includes five blocks WU3, WU4, WU5, WU6, WU7 of the stripe. As noted above, the sub-stripes may be allocated to have different sizes based at least in part on the rate at which the different types of data are received. The present configuration may thereby be set based on relocation writes being received at a higher rate than new user (e.g., host) writes. The size of the respective sub-stripes may also be adjusted in response to performing a garbage collection operation on plane 422 as a whole, e.g., as would be appreciated by one skilled in the art after reading the present description.

The sub-stripes 424, 426 also include RAID parity data in each of the sub-page stripes therein. Moreover, each sub-page stripe in the present configuration includes two sub-page stripes. In other words, each pair (e.g., subset) of the physical sub-page stripes in a same one of the sub-stripes includes a RAID parity page. For instance, sub-page stripe 428 includes pages that are located in page stripes WL0, WL1, with RAID parity data in the page in the third block WU2 of the plane 422. Sub-page stripe 430 also includes pages that are located in page stripes WL0, WL1, with RAID parity data in the page in the eighth block WU7 of the plane 422. While each pair of sub-page stripes in the physical sub-page stripes include a RAID parity page, the present configuration does not shift the specific page in the sub-page stripe that is used to store the parity data. However, this is in no way intended to be limiting, as other implementations may selectively rotate the location of RAID parity pages within each respective sub-page stripe (e.g., see FIGS. 4A-4B).

Figures 4D, 4E:
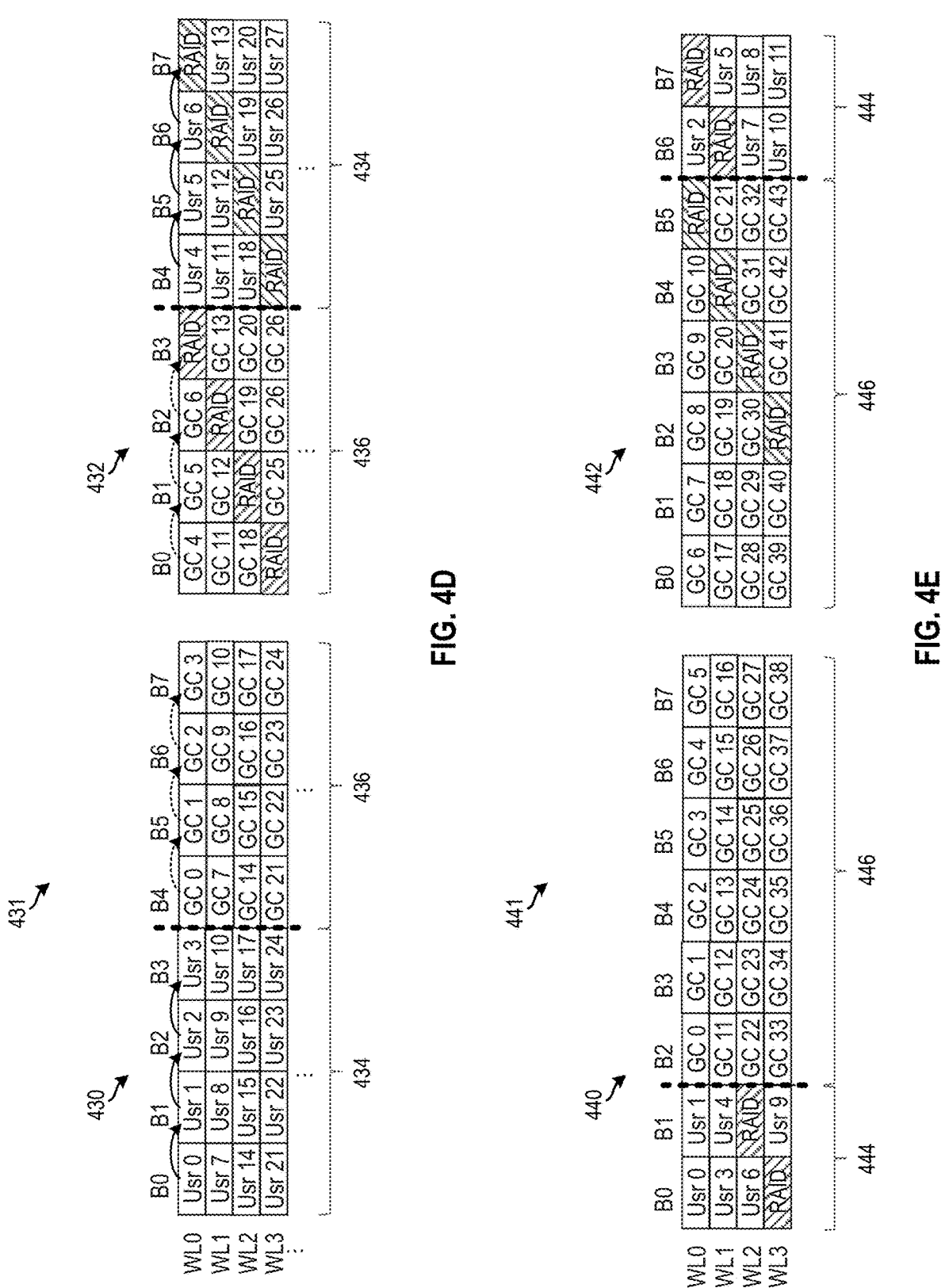
FIG. 4D is a representational view of two stripes of non-volatile memory with sub-stripes allocated thereacross, in accordance with an in-use example.
FIG. 4E is a representational view of two stripes of non-volatile memory with sub-stripes allocated thereacross, in accordance with an in-use example.

Looking now to FIGS. 4D-4E, a write stripe has been expanded to extend across blocks B0, B1, B2, etc. in banks of stripes in the non-volatile storage. For instance, FIG. 4D illustrates that the first and second sub-stripes are allocated such that they extend across both the first and second stripes 430, 432 of a bank 431 in memory. Thus, two block stripes are built from 16 blocks (e.g., 2 blocks from each channel). In other words, a first sub-stripe 434 includes sub-page stripes in each page stripe of the first stripe 430 in bank 431, as well as sub-page stripes in each page stripe of the second stripe 432 in bank 431. Similarly, the second sub-stripe 436 includes sub-page stripes in each page stripe of the first stripe 430 and sub-page stripes in each page stripe of the second stripe 432. It follows that the block B0 in the first stripe 430 is a different block than the block B0 in the second stripe 432 (i.e., the index only denotes from which channel the block is) and similarly for blocks B1 to B7.

RAID parity has also been selectively added to only the second stripe 432 of bank 431. Moreover, the process of writing data to memory preferably includes alternating writing between the different sets of blocks of the stripes. Each of the 8 blocks in the sub-stripes can further be independently garbage collected without impacting the other sub-stripe. This keeps a consistent write overhead with 7 pages of data and one parity page for each sub-stripe. Furthermore, because the RAID parity is striped across the pages in the sub-page stripes of second stripe 432, the approach is desirably able to protect against write unit failures.

Although the memory has been allocated such that the sub-stripes 434, 436 are the same size (e.g., include sub-page stripes that are the same length), this is in no way intended to be limiting. Again, approaches herein are able to selectively reallocate sub-stripes such that they are an appropriate size for the data being stored therein. For instance, FIG. 4E depicts a different configuration of sub-stripes that extend across two stripes of a given bank. Specifically, a first sub-stripe 444 includes sub-page stripes in each page stripe of the first stripe 440 in bank 441, as well as sub-page stripes in each page stripe of the second stripe 442 in bank 441. Similarly, the second sub-stripe 446 includes sub-page stripes in each page stripe of the first plane 440 and sub-page stripes in each page stripe of the second stripe 442.

This configuration (e.g., allocation of the memory) may be implemented in situations where write amplification is high and more data needs to be relocated internally than host writes are processed. Alternative embodiments may use this configuration when host writes are received at a lower rate than relocation writes. Moreover, RAID parity may be striped across the various sub-page stripes as illustrated. Again, this allows for the approaches herein to be able to protect against write unit failures.

It should be noted that although FIGS. 4D-4E each only show the sub-stripes extending across banks having two stripes with a single plane of memory therein, approaches herein may be applied to any desired number of blocks containing any desired number of stripes and planes therein. For instance, in some approaches the memory may be allocated such that there is one page of RAID parity for each sub-stripe in a given bank. In other approaches, the memory may be allocated such that a single page of RAID parity data exists over all banks for each sub-stripe. It follows that the memory may be allocated differently depending on user inputs, write stream heat, importance of the data, etc.

Figure 4F:
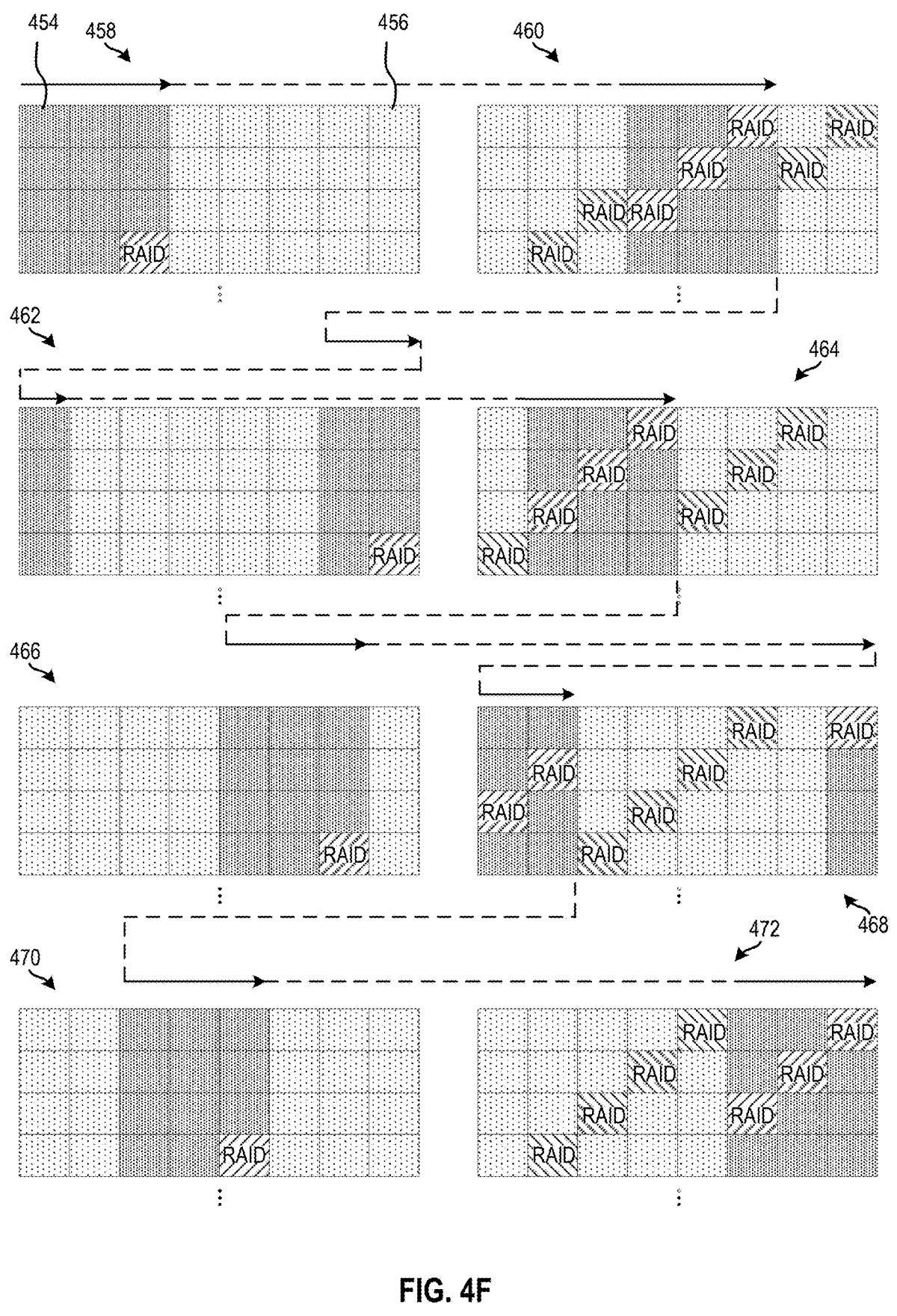

For instance, FIG. 4F illustrates a configuration that is designed to balance the assignment of blocks to host writes and relocation writes across a plurality of stripes in memory that may be combined into different banks.

Thus, although the different sub-stripes correspond to different blocks in each stripe, each sub-stripe assigned to store the same kind of data includes the same number of blocks therein. Specifically, each stripe shown in FIG. 4F includes a first sub-stripe 454 assigned to store host writes which includes three blocks, and a second sub-stripe 456 assigned to store relocation writes which includes five blocks. Again, while the configuration (e.g., arrangement) of the blocks in each sub-stripe differs for each of the stripes, the ratio of blocks in each sub-stripe remains constant.

While data may be written to the pages in the respective sub-stripes 454, 456 as desired, in some approaches it is preferred that data is written to memory in a wrapped fashion. In other words, some approaches involve writing data to the sub-page stripes of the respective first and second sub-stripes 454, 456 by wrapping back to the first block. FIG. 4F illustrates an exemplary progression of allocating blocks to the first sub-stripe 454, in accordance with a non-limiting example. There, block allocation begins for sub-stripe 454 at a first page in a first block of the first sub-page stripe in stripe 458. The allocation advances to each page in the remaining blocks of the first sub-page stripe in the first stripe 458, before advancing to a first page in the second stripe 460 of the first sub-page stripe. Note that the blocks in each of the sub-stripes do not overlap channels. The solid part of the arrow above the block stripes denotes the data placement sequence for sub-stripe 454. It follows that although the first three blocks of sub-stripe 454 are located in stripe 458, the fourth block of sub-stripe 454 is located in stripe 460, e.g., as shown.

In response to allocating the last page in the first page stripe of the second stripe 460, the process wraps back and allocates a first page in a second sub-page stripe of the first stripe 458, followed by the second sub-page stripe of the second stripe 460. The controller performs the write operations to the first half of sub-page stripes 454 and 456 about the same time before processing with the second half of sub-page stripes 454 and 456 which will again be programmed about the same time. This is done to avoid blocking a write operation due to another write going to the same channel/plane. The pages are allocated to the second sub-page stripe by offsetting the RAID parity by one page in the respective sub-page stripe, e.g., as shown. However, the RAID parity and other data may be allocated using any desired offset(s) and/or processes.

This progresses until a final page in the last sub-page stripe of stripe 460 is allocated. There, the progression advances to page in a next one of the block stripes in the third block stripe 462, where data placement for the first sub-stripe starts the next offset where the previous sub-stripe ended in stripe 460 before returning to the first page in the same sub-page stripe, e.g., as illustrated by the progression of arrowed lines. Moreover, this process is repeated for each of the illustrated stripes 458, 460, 462, 464, 466, 468, 470, 472.

Moreover, RAID parity data may be added to the respective sub-stripes 454, 456 in a round robin fashion, e.g., as shown in FIG. 4F. This process is currently shown as beginning at a last page in the first page stripe extending across stripes 458, 460. Stripes 458, 460 may thereby effectively serve as a first bank. As noted above, the RAID parity may be offset by one page in each subsequent subpage stripe. Again, this desirably allows for the approaches herein to be resistant to experiencing write unit failures.

Again, approaches herein are desirably able to overcome the conventional shortcomings by organizing blocks in a non-volatile storage controller using multiple planes, such that a write stripe is formed using a single block from each plane. Moreover, by grouping the blocks from the write stripe into at least two different sub-stripes, approaches herein are able to use different sub-stripes to store different types of data. The sub-stripes may also be allocated to be a desired size, e.g., based on the rate at which different types of data are being received and/or write amplification. This allows approaches herein to desirably garbage collect each of the sub-stripes individually without impacting data in the remaining sub-stripe(s) of the same block(s), e.g., as described herein.

It will be clear that the various features of the foregoing systems and/or methodologies may be combined in any way, creating a plurality of combinations from the descriptions presented above.

It will be further appreciated that implementations of the present invention may be provided in the form of a service deployed on behalf of a customer to offer service on demand.

The descriptions of the various implementations of the present invention have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

What is claimed is:

1. A method for organizing blocks in a non-volatile storage controller, comprising:
   forming a write stripe using a single block from channels of the non-volatile storage;
   forming first and second logical erase units by grouping the blocks from the formed write stripe into at least first and second sub-stripes;
   assigning the first sub-stripe to store new data; and
   assigning the second sub-stripe to store relocation data, wherein writing data to the respective sub-stripes is performed sub-page stripe by sub-page stripe.

2. The method of claim 1, further comprising:
   causing garbage collection to be performed only on the blocks in the first sub-stripe or the second sub-stripe, respectively.

3. The method of claim 1, wherein the sub-page stripes in the first sub-stripe are a same size, wherein the sub-page stripes in the second sub-stripe are a same size.

4. The method of claim 3, wherein sizes of the sub-page stripes in the respective first and second sub-stripes are set based at least in part on a measured write amplification.

5. The method of claim 1, further comprising:
   causing new data to be written to a first sub-page stripe in the first sub-stripe in parallel with causing relocation data to be written to a first sub-page stripe in the second sub-stripe,
   wherein the first sub-page stripe in the first sub-stripe has a same page index as the first sub-page stripe in the second sub-stripe.

6. The method of claim 1, wherein each of the sub-page stripes include RAID parity.

7. The method of claim 1, wherein each pair of the sub-page stripes in a same one of the first and second sub-stripes includes RAID parity.

8. The method of claim 1, wherein the write stripe extends across first and second planes of the non-volatile storage, wherein the first sub-stripe includes sub-page stripes in the first plane and sub-page stripes in the second plane, wherein the second sub-stripe includes sub-page stripes in the first plane and sub-page stripes in the second plane.

9. The method of claim 8, wherein data is written to the sub-page stripes of the respective first and second sub-stripes in a round robin order.

10. A computer program product for organizing blocks in a non-volatile storage controller, the computer program product comprising:
    one or more computer-readable storage media; and
    program instructions stored on the one or more storage media to perform operations comprising:
       forming a write stripe using a single block from channels of the non-volatile storage;
       forming first and second logical erase units by grouping the blocks from the formed write stripe into at least first and second sub-stripes;
       assigning the first sub-stripe to store new data; and
       assigning the second sub-stripe to store relocation data, wherein writing data to the respective sub-stripes is performed sub-page stripe by sub-page stripe.

11. The computer program product of claim 10, wherein the operations further comprise:
    causing garbage collection to be performed only on the blocks in the first sub-stripe or the second sub-stripe, respectively.

12. The computer program product of claim 10, wherein the sub-page stripes in the first sub-stripe are a same size, wherein the sub-page stripes in the second sub-stripe are a same size.

13. The computer program product of claim 12, wherein sizes of the sub-page stripes in the respective first and second sub-stripes are set based at least in part on a measured write amplification.

14. The computer program product of claim 10, wherein the operations further comprise:
    causing new data to be written to a first sub-page stripe in the first sub-stripe in parallel with causing relocation data to be written to a first sub-page stripe in the second sub-stripe,
    wherein the first sub-page stripe in the first sub-stripe has a same page index as the first sub-page stripe in the second sub-stripe.

15. The computer program product of claim 10, wherein each of the sub-page stripes include RAID parity.

16. The computer program product of claim 10, wherein each pair of the sub-page stripes in a same one of the first and second sub-stripes includes RAID parity.

17. The computer program product of claim 10, wherein the write stripe extends across first and second planes of the non-volatile storage, wherein the first sub-stripe includes sub-page stripes in the first plane and sub-page stripes in the second plane, wherein the second sub-stripe includes sub-page stripes in the first plane and sub-page stripes in the second plane.

18. The computer program product of claim 17, wherein data is written to the sub-page stripes of the respective first and second sub-stripes in a round robin order.

19. A computer system for organizing blocks in a non-volatile storage controller, the computer system comprising:

a processor set;

one or more computer-readable storage media; and program instructions stored on the one or more storage media to cause the processor set to perform operations comprising:

forming a write stripe using a single block from channels of the non-volatile storage;

forming first and second logical erase units by grouping the blocks from the formed write stripe into at least first and second sub-stripes;

assigning the first sub-stripe to store new data; and assigning the second sub-stripe to store relocation data, wherein writing data to the respective sub-stripes is performed sub-page stripe by sub-page stripe.

20. The computer system of claim 19, wherein the operations further comprise:

causing garbage collection to be performed only on the blocks in the first sub-stripe or the second sub-stripe, respectively, wherein each of the sub-page stripes include RAID parity.

\* \* \* \* \*